US009380342B2

(12) United States Patent
Tang et al.

(10) Patent No.: US 9,380,342 B2
(45) Date of Patent: Jun. 28, 2016

(54) SYSTEMS AND METHODS FOR CONTROL OF MEDIA ACCESS BASED ON CROWD-SOURCED ACCESS CONTROL DATA AND USER-ATTRIBUTES

(71) Applicant: United Video Properties, Inc., Santa Clara, CA (US)

(72) Inventors: Young A. Tang, Burbank, CA (US); Paul T. Stathacopoulos, San Carlos, CA (US)

(73) Assignee: Rovi Guides, Inc., San Carlos, CA (US)

( * ) Notice: Subject to any disclaimer, the term of this patent is extended or adjusted under 35 U.S.C. 154(b) by 15 days.

(21) Appl. No.: 14/194,259

(22) Filed: Feb. 28, 2014

(65) Prior Publication Data

US 2015/0249864 A1 Sep. 3, 2015

(51) Int. Cl.

| | |
|---|---|
| ***H04N 21/4627*** | (2011.01) |
| ***H04N 21/475*** | (2011.01) |
| ***H04N 21/442*** | (2011.01) |
| ***H04N 21/466*** | (2011.01) |
| ***H04N 21/45*** | (2011.01) |
| ***H04N 21/454*** | (2011.01) |
| ***H04N 21/441*** | (2011.01) |
| ***H04N 21/258*** | (2011.01) |
| ***H04N 21/24*** | (2011.01) |
| ***G06Q 30/00*** | (2012.01) |

(52) U.S. Cl.

CPC ........... *H04N 21/4627* (2013.01); *G06Q 30/00* (2013.01); *H04N 21/2407* (2013.01); *H04N 21/25875* (2013.01); *H04N 21/441* (2013.01); *H04N 21/442* (2013.01); *H04N 21/44204* (2013.01); *H04N 21/44213* (2013.01); *H04N 21/44218* (2013.01); *H04N 21/44236* (2013.01); *H04N 21/454* (2013.01); *H04N 21/4532* (2013.01); *H04N 21/4542* (2013.01); *H04N 21/4661* (2013.01); *H04N 21/4667* (2013.01); *H04N 21/475* (2013.01); *H04N 21/4753* (2013.01)

(58) Field of Classification Search

CPC .................... H04N 21/2407; H04N 21/25875; H04N 21/442; H04N 21/44204; H04N 21/44236; H04N 21/44218; H04N 21/454; H04N 21/4627; H04N 21/475–21/4753

See application file for complete search history.

(56) References Cited

U.S. PATENT DOCUMENTS

| | | | |
|---|---|---|---|
| 6,239,794 | B1 | 5/2001 | Yuen |
| 6,388,714 | B1 | 5/2002 | Schein |
| 6,564,378 | B1 | 5/2003 | Satterfield |
| 6,756,997 | B1 | 6/2004 | Ward |
| 7,165,098 | B1 | 1/2007 | Boyer |

(Continued)

*Primary Examiner* — Ricky Chin

(74) *Attorney, Agent, or Firm* — Ropes & Gray LLP

(57) ABSTRACT

Systems and methods for controlling media access based on crowd-sourced access control data and user attributes are provided. Crowd-sourced data is received from several sources in order to determine what media assets consumers are accessing, and catalog attributes of the media assets and attributes of the accessing consumers. A user-attribute-based access control function, such as a parental control feature of an interactive media guide, uses this data to control access to media assets provided by the system. When a user attempts to access a media asset, the access control function determines whether the media asset has an attribute similar to assets accessed by other users having one or more user-attributes similar to those of the accessing user. If the media asset is not sufficiently similar to assets accessed by other sufficiently-similar users, access to the media asset will be blocked unless an appropriate access code is entered.

16 Claims, 19 Drawing Sheets

(56) References Cited

U.S. PATENT DOCUMENTS

| | | | |
|---|---|---|---|
| 7,761,892 B2 | 7/2010 | Ellis | |
| 8,046,801 B2 | 10/2011 | Ellis | |
| 2002/0120925 A1 | 8/2002 | Logan | |
| 2002/0174430 A1 | 11/2002 | Ellis | |
| 2003/0110499 A1 | 6/2003 | Knudson et al. | |
| 2005/0251827 A1 | 11/2005 | Ellis | |
| 2009/0131152 A1* | 5/2009 | Busse | 463/23 |
| 2010/0153885 A1 | 6/2010 | Yates | |
| 2014/0007154 A1* | 1/2014 | Seibold et al. | 725/25 |
| 2014/0101691 A1* | 4/2014 | Sinha et al. | 725/32 |

* cited by examiner

700

```
702  <Session_ID_123>
704          <source>www.mysocialnetwork.com</source>
706          <datum1>"the history channel has a program about ninjas, but it
     shows how to make ancient ninja weapons; inappropriate for kids under
     16"</datum1>
708  </Session_ID_123>
```

710

```
712  <Session_ID_456>
714          <source>editorial_ratings_source</source>
716          <gender>female</gender>
718          <category>teenage</category>
720          <comment>"not recommended"</comment>
722          <genre>"teen moms"</genre>
724  </Session_ID_456>
```

730

```
732  <Session_ID_321>
734          <source>www.moviedatabase.com</source>
736          <age_group>any</age_group>
738          <genre>cartoon</genre>
740          <language>english</language>
742          <title>"teenage mutant ninja turtles"</title>
744  </Session_ID_321>
```

750

```
752  <Session_ID_789>
754          <source>interactive_video_guide</source>
756          <security_level>guest</security_level>
758          <access_duration>00:00:24</access_duration>
760          <status>"accessed"</status>
762          <title>"product commercial #4321"</title>
764  </Session_ID_789>
```

```
802 <Session_ID_A3456>
804         <age_group>12-15</age_group>
806         <gender>male</gender>
808         <title>"ancient ninja weapons"</title>
810         <genre>"history"</genre>
812         <threshold_level>2</threshold_level>
814 </Session_ID_A3456>
```

820

```
822 <Session_ID_A9876>
824         <age>8</age>
826         <gender>male</gender>
828         <title>" teenage mutant ninja turtles"</title>
830         <genre>"cartoon"</genre>
832         <threshold_level>4</threshold_level>
834 </Session_ID_A9876>
```

840

```
842 <Session_ID_A3456_1>
844         <permission>denied</permission>
846 </Session_ID_A3456_1>
```

860

```
842 <Session_ID_A9876_1>
844         <03777><status>positive</status><age>9</age><title>" teenage
    mutant ninja turtles"</title></03777>
846         <03888><status>positive</status><gender>male</male><title>"
    teenage mutant ninja turtles"</title>></03888>
846 </Session_ID_A9876_1>
```

```
902 <Record_ID_03666>
904         <status>negative</status>
906         <age_group>15_and_under</age_group>
908         <genre>"history"</genre>
910         <content_keyword_1>"weapons"</content_keyword_1>
912         <content_keyword_2>"ninja"</content_keyword_2>
914 </Record_ID_03666>
```

920

```
922 <Record_ID_03777>
924         <status>positive</status>
926         <age>9</age>
928         <title>" teenage mutant ninja turtles"</title>
930 </Record_ID_03777>
```

940

```
942 <Record_ID_03888>
944         <status>positive</status>
946         <gender>male</male>
948         <title>" teenage mutant ninja turtles"</title>
950 </Record_ID_03888>
```

SYSTEMS AND METHODS FOR CONTROL OF MEDIA ACCESS BASED ON CROWD-SOURCED ACCESS CONTROL DATA AND USER-ATTRIBUTES

BACKGROUND

This disclosure relates to systems and methods for controlling media access based on user-attributes (e.g., age). Systems have been developed that allow a user, such as a parent, to control access to media according to what the user deems appropriate based on the age and maturity level of another user, such as the user's child. For example, many television systems provide a parental control feature that allows a user to set ratings limits for what can be accessed on a television. Television programs are associated with ratings designating an age-appropriate level for the program, such as "R" or "TV-MA", based on the program's content. To access a program exceeding the established rating limit, a user typically must enter a password.

SUMMARY OF THE INVENTION

Systems and methods are disclosed herein which provide access control of media based on crowd-sourced access control data for rating media assets. The present systems and methods use crowd-sourced data to determine what media assets consumers are accessing, and catalogs attributes of the media assets and attributes of the accessing consumers. A user-attribute-based access control function, such as a parental control feature of an interactive media guide for example, uses this data to control access to media assets provided by the system. When a user attempts to access a media asset, the access control function determines whether the media asset has one or more attributes similar to assets accessed by other users having one or more user-attributes similar to the presumed or actual attributes of the accessing user. If the media asset is not sufficiently similar to assets accessed by other sufficiently-similar users, access to the media asset will be blocked unless an appropriate access code is entered.

The media access control function may be employed in any suitable media access system. For example, it may execute in an interactive media guidance system (on, for example, user equipment or on a service provider's server), or an Internet/web browsing system (as part of, for example, a browser enhancement or server-side application logic), or any other system which provides access to media. The crowd-sourced access control data may be obtained by or supplied to the access control function using any suitable approach. For example, the data may be provided as clickstream data (usage data) from an interactive media guide, by a data mining function applied to Facebook posts, by editor-supplied ratings information, or using any other suitable approach. Facebook is a trademark owned by the Facebook, Inc.

The "media access control function" in one embodiment is a set of computer instructions stored on nontransitory computer-readable media (e.g., an EPROM, RAM or a hard disk, for example). These instructions are executed by suitable control circuitry (e.g., one or more microprocessors, input/output (hereinafter "I/O") circuitry, and other well-known circuitry coupled via communications paths (such as buses), for executing computer instructions) of a computer, server, set-top box, tablet device, smart phone, or other device employed by a user or service provider within a media access system. In some embodiments, the control circuitry is an application specific integrated circuit (ASIC) or system-on-chip (SOC) which may include one or more microprocessors, memory blocks, and other suitable blocks. In still other embodiments, the control circuitry is a field programmable gate array (FPGA) structured to implement the logic and functionality of the media access control function.

By way of example, and not by way of limitation, the media access control function may be an executable module within an interactive media guide, such as an interactive television program guide, running on a user's cable or satellite set-top box, smart phone, tablet, personal computer, or other consumer-electronic device, or running on a server which serves a guide client running on a user's consumer-electronic device. The guide identifies a relevant attribute or attributes of a user attempting to access a media asset. In such systems, a typical attribute would be the user's age, and the media asset is a video program such as a linear asset or non-linear asset. The user's age may be actually determined by the guide. For example, the user may log in, or be identified through monitored user behavior, and an attribute associated with the user, such as the user's age, may be determined by a profile associated with the user or the monitored behavior. Alternatively, the guide may use an effective age, such as when a ratings-based parental control function is active. If, for example, a rating of "TV-14" was set as the maximum rating in the parental control function, the effective age would be for example "13". The guide also identifies one or more attributes of the asset for which access is sought. This may be based on metadata describing one or more attributes of the asset, such as metadata accompanying the asset, or data stored in a guide database.

The guide also identifies attributes of assets accessed by users with similar attributes, in this example, other users who are age 13 (or younger). The guide may, for example, interrogate a local database of crowd-sourced access control data, and derive those attributes which are typical of assets accessed by other users who are 13 (or younger). In another suitable approach, the guide may have only a table of the attributes indexed by age (or age group). Such information may be provided by a remote source tasked with providing the attribute data. In other suitable approaches, the guide instead interrogates a remote server (either the guide server, or another server such as a third party server). The server may return "raw" attribute information; that is, a series of records of assets and their recorded attributes. Alternatively, the server may return to the guide a list of attributes derived from crowd-sourced access control data and associated with the age. In still another approach, the server may instead receive from the guide the identified user-attribute (in this example the age or age group) and an identifier, or the attributes of, the asset for which access is sought. The server may compare this information to the crowd-sourced access control data to determine whether the content for which access is sought is similar to content accessed by similarly-aged users.

When the guide (or a non-guide server) determines the content for which access is sought is not similar to content accessed by similarly-aged users, user access will be blocked unless the appropriate access code is supplied. For example, assume the user attempted to access "Teenage Mutant Ninja Turtles" which may be normal for a five year old, hence a five year old accessing this show will not trigger parental blocking and the need for a code. But should the child access a show on the History Channel discussing how to make ancient ninja weapons, access will be blocked if the crowd-sourced access control data indicates that other five-year-old children do not tend to access such programs. Note in a typical parental control prior art system, access would not be blocked if the show were rated "TV-PG" and a ratings-based parental control for "TV-14" and above is set. Thus, the presently disclosed approach provides an enhanced way of ensuring user-attribute-based (e.g., age) media access control.

Crowd-sourced access control data may be obtained by the access control function using any suitable approach. A media access control server receives media consumption data from one or more user devices or other servers via a network (e.g., a private network, the Internet, or a combination thereof). The media consumption data includes (a) user data and (b) media data. In some embodiments, user media access is monitored, such as in interactive media guidance systems or other systems where users access, rather than merely comment on, content. In such systems, user data will include attribute data of the user. This may include an attribute or attributes of the user that directly reflect an attribute relevant to media access control (e.g., age, priority level, clearance level, etc.), or which may be used to obtain such relevant attributes (e.g., a user identifier which is used to access to the user's profile and retrieve such relevant attributes). The media data may include an attribute or attributes of the media asset relevant to media access control (e.g., title, description, content rating, genre, etc.), or which may be used to obtain such relevant attributes (e.g., a resource identifier which is used to access a database and retrieve relevant media attributes).

Media consumption data may be provided by systems which allow users to describe media, such as social media systems (e.g., Facebook) or editorial systems (e.g., blogs where persons may comment on media). In such systems, posts may identify media and an accessing user, or instead may include information identifying users for which identified media is appropriate. In a social media web site for example, a user may indicate they just watched a particular show on television. The user's account is mined by the crowd-sourced data mining server, and the user's identification is used to associate user-attributes (e.g., the user's age) with the identified asset. Or, a user may comment (whether in a social media application or in a blog, for example) on a show such as by saying: "the History Channel has a program about ninjas but it shows how to make ancient ninja weapons; inappropriate for kids under 16". The media access control generator may mine that post (using natural language processing mechanisms, for example) to identify the program and various attributes (e.g., "ninjas", "weapons", "history"), and attributes regarding accessing users (e.g., "15" or "15 and under"). When multiple user accounts and posts are mined, a database of crowd-sourced access control data is stored for use by the media access control function.

Media consumption data may also be received from systems which originate editorial ratings information from, for example, industry rating professionals. Unlike traditional ratings, such information will not identify particular assets, but rather identify attributes which are, or are not, appropriate for various user-attributes.

In Some embodiments, media consumption data may be dynamically shared by user equipment that monitors the behavior of a user or group of users, such as thought leaders, trusted friends, or specific individuals. The content viewing threshold of the user or group of users may be tracked over time in order to create an evolving filter, as sentiment and tolerance of users may change over time. For example, the fashion taste of a rock star may be monitored by her computer, or retrieved from fashion-related tweets that she had published. This information may be used to selectively present fashion information to her fan groups by recommending certain fashion trends in line with the rock star's taste, and blocking others.

The media access control function may determine the similarity between the user and desired asset on one hand, and the media access control data on the other, using any suitable approach. User-attributes may be identified as keys for purposes of making a media access control determination. For example, only the age or security level of a user's profile and the media access control data may be used. As to the media for which access is desired, the media access control function may first attempt to match the asset identifier of the desired content with those of the media access control data. Additionally, or alternatively, the media access control function determines whether other attributes of the media and media access control data match. If there is a similarity, the media access control function determines that the desired media is similar to what other users have accessed, and permits access. If there is no match, an access code will be required for access.

In some embodiments, a user request to access a media asset may be received at a user equipment. The user equipment may then retrieve a user attribute that is associated with the requesting user, and a media attribute that is associated with the media asset requested. The user attribute may be retrieved by receiving a user input indicating an attribute of the user, such as an age, age group, gender, profession, citizenship, marital status, security level, or priority level. The media attribute may be a title, genre, media rating, content keyword, performer, or release date.

A determination is then made regarding whether access to media assets associated with the media attribute was denied for a number of users who are associated with the user attribute. The determination may be made by retrieving data associated with the media attribute and the number of users from a database, and then comparing the retrieved data with a threshold value. The threshold value here may indicate a percentage of the number of users whose access to the media assets was denied. If access was indeed denied, the user's request to access the media asset may be denied as well. Otherwise, the requested media asset may be generated for display.

In some implementations, the user's request to access the media asset may be denied by retrieving the threshold associated with the user, generating a statistical value showing a fraction of the number of users whose access to the media assets were denied, and comparing the threshold to the statistical value. If the threshold matches the statistical value, the user's request may also be denied. After a user's request to access is denied, a prompt may be generated for display for the user to enter a passcode in order to access the media asset. In some embodiments, a determination may also be made regarding whether access to media assets was also denied by a ratings-based access control.

BRIEF DESCRIPTION OF THE DRAWINGS

User-attribute-based media access control (e.g., parental control) is an important functionality in many media content delivery systems. The above and other objects and advantages of the invention will be apparent upon consideration of the following detailed description, taken in conjunction with the accompanying drawings, in which like reference characters refer to like parts throughout, and in which:

FIG. 7 shows illustrative examples of a data structure indicating crowd-sourced media consumption information in accordance with some embodiments of the disclosure;

FIG. 8 shows illustrative examples of a data structure indicating requests from user equipment devices to a media access control server, and a data structure indicating corresponding responses from the media access control server in accordance with some embodiments of the disclosure;

FIG. 9 shows illustrative examples of a data structure corresponding to information stored in a database for use in implementing media access control function in accordance with some embodiments of the disclosure;

DETAILED DESCRIPTION OF EMBODIMENTS

Figure 1:
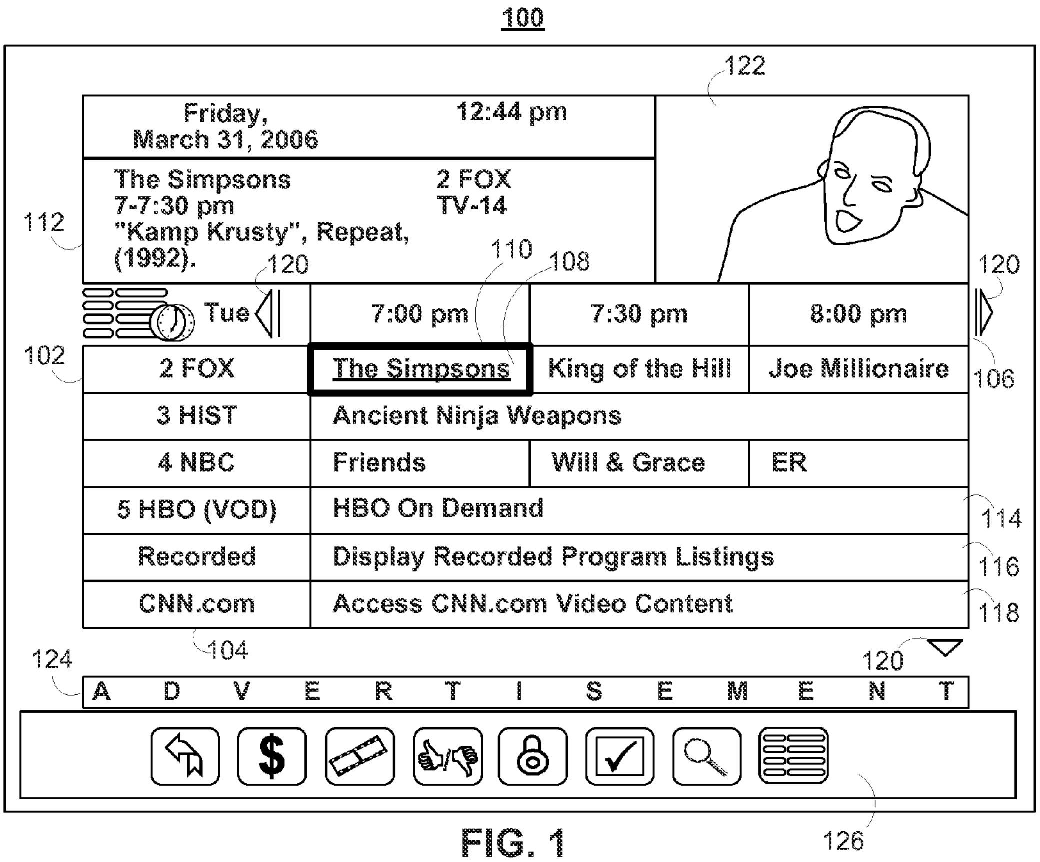
FIGS. 1 and 2 show illustrative display screens that may be used to provide interactive media guidance application listings in accordance with some embodiments of the disclosure.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms “media asset” and “content” should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, web sites/web pages, articles, books, electronic books, blogs, advertisements, chat sessions, social media, applications, games, and/or any other media or multimedia and/or combination of the same. Guidance applications also allow users to navigate among and locate content. As referred to herein, the term “multimedia” should be understood to mean content that utilizes at least two different content forms described above, for example, text, audio, images, video, or interactivity content forms. Content may be recorded, played, displayed or accessed by user equipment devices, but can also be part of a live performance.

With the advent of the Internet, mobile computing, and high-speed wireless networks, users are accessing media on user equipment devices on which they traditionally did not. As referred to herein, the phrase “user equipment device,” “user equipment,” “user device,” “electronic device,” “electronic equipment,” “media equipment device,” or “media device” should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase, "media guidance data" or "guidance data" should be understood to mean any data related to content, such as media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), advertisement information (e.g., text, images, media clips, etc.), on-demand information, blogs, web sites, and any other type of guidance data that is helpful for a user to navigate among and locate desired content selections.

Figure 2:
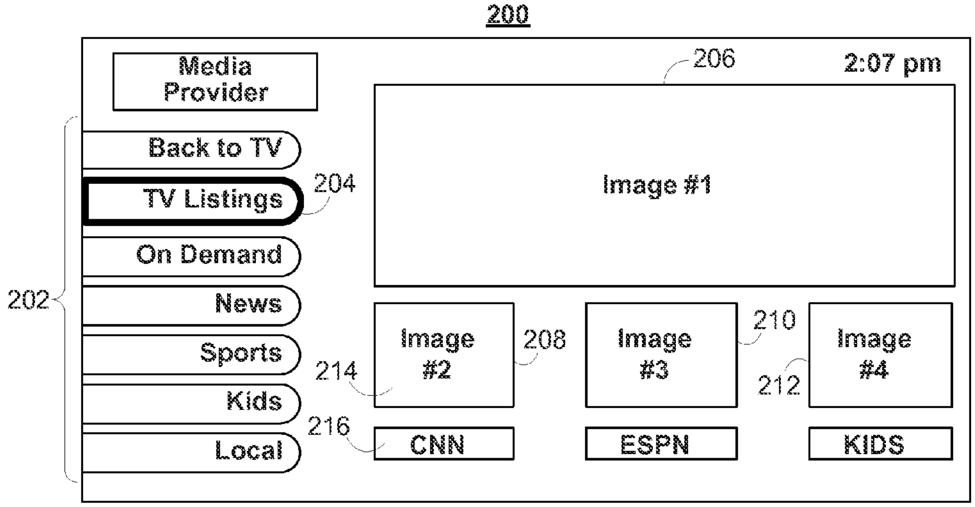

FIGS. 1-2 show illustrative display screens that may be used to provide media guidance data. The display screens shown in FIGS. 1-2, 10, and 14-18 may be implemented on any suitable user equipment device or platform. While the displays of FIGS. 1-2, 10, and 14-18 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria. The organization of the media guidance data is determined by guidance application data. As referred to herein, the phrase, "guidance application data" should be understood to mean data used in operating the guidance application, such as program information, guidance application settings, user preferences, or user profile information.

FIG. 1 shows illustrative grid program listings display 100 arranged by time and channel that also enables access to different types of content in a single display. Display 100 may include grid 102 with: (1) a column of channel/content type identifiers 104, where each channel/content type identifier (which is a cell in the column) identifies a different channel or content type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to, or alternative to, providing access to linear programming (e.g., content that is scheduled to be transmitted to a plurality of user equipment devices at a predetermined time and is provided according to a schedule), the media guidance application also provides access to non-linear assets (e.g., content accessible to a user equipment device at any time and is not provided according to a schedule). Non-linear assets may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 102 may provide media guidance data for non-linear assets including on-demand listing 114, recorded content listing 116, and Internet content listing 118. A display combining media guidance data for content from different types of content sources is sometimes referred to as a "mixed-media" display. Various permutations of the types of media guidance data that may be displayed that are different than display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In some embodiments, listings for these content types may be included directly in grid 102. Additional media guidance data may be displayed in response to the user selecting one of the navigational icons 120. (Pressing an arrow key on a user input device may affect the display in a similar manner as selecting navigational icons 120.)

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 124 may provide an advertisement for content that, depending on a viewer's access rights (e.g., for subscription programming), is currently available for viewing, will be available for viewing in the future, or may never become available for viewing, and may correspond to or be unrelated to one or more of the content listings in grid 102. Advertisement 124 may also be for products or services related or unrelated to the content displayed in grid 102. Advertisement 124 may be selectable and provide further information about content, provide information about a product or a service, enable purchasing of content, a product, or a service, provide content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

Options region 126 may allow the user to access different types of content, media guidance application displays, and/or media guidance application features. Options region 126 may be part of display 100 (and other display screens described herein), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. The user profile information may include identifiers of one or more social networks or blogs the user is associated with. For each social network or blog, a username and password (e.g., log-in information) may be stored in the user profile information. Such information in the user profile may be used to transmit the user's media consumption data (including user data, such as clickstream data corresponding to a usage history, and media data) to a remote server (e.g., media access control server 324 in FIG. 3). The remote server then compiles "crowd-sourced" media consumption data from many users. In return, the user equipment may query the remote server for personalized media access control options. This type of user experience is described in greater detail below in connection with FIGS. 3, 4, and 7. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 2. Video mosaic display 200 includes selectable options 202 for content information organized based on content type, genre, and/or other organization criteria. In display 200, television listings option 204 is selected, thus providing listings 206, 208, 210, and 212 as broadcast program listings. In display 200 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 208 may include more than one portion, including media portion 214 and text portion 216. Media portion 214 and/or text portion 216 may be selectable to view content in full-screen or to view information related to the content displayed in media portion 214 (e.g., to view listings for the channel that the video is displayed on).

The listings in display 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Dec. 29, 2005, which is hereby incorporated by reference herein in its entirety.

Figure 3:
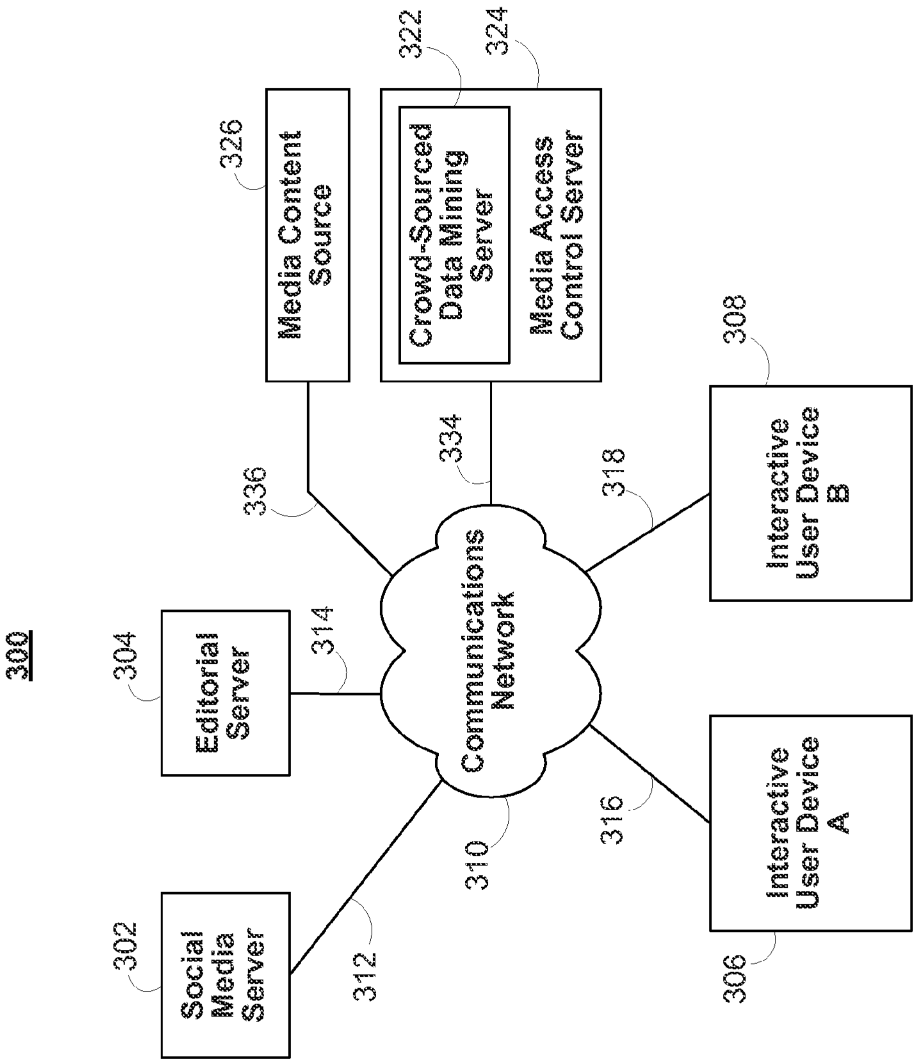
FIG. 3 is a diagram of an illustrative crowd-sourced access control system in accordance with some embodiments of the disclosure.

The display screens in FIGS. 1 and 2 can be generated for display by interactive user devices 306 and 308 of system 300 in FIG. 3. The interactive user devices 306 and 308 may function as stand-alone devices or may be part of a network of devices. Various network configurations of devices may be implemented and are discussed in more detail below.

The interactive user devices 306 and 308 may be coupled to communications network 310 via communications paths 316 and 318, respectively. Each user of the interactive user devices 306 and 308 may be associated with other users in a crowd of users. Communications network 310 may be one or more networks including the Internet, a mobile phone network, mobile voice or data network (e.g., a 4G or LTE cellular network), cable network, satellite telecommunication network, public switched telephone network, or other types of communications network or combinations of communications networks. Path 316 or 318 may include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combinations of such paths.

Although communications paths are not drawn between interactive user devices 306 and 308, these devices may communicate directly with each other via communication paths, such as those described above in connection with paths 316 and 318, as well as other short-range point-to-point communication paths, such as USB cables, IEEE 1394 cables, wireless paths, (e.g., Bluetooth, infrared, IEEE 802.11x, etc.), or other short-range communication via wired or wireless paths. BLUETOOTH is a certification mark owned by Bluetooth SIG, INC. The interactive user devices may also communicate with each other through an indirect path via communications network 310.

System 300 also includes social media server 302, editorial server 304, media content source 326 and media access control server 324 coupled to communications network 310 via communication paths 312, 314, 336, 338 and 334, respectively. Paths 312, 314, 336, 338 and 334 may include any of the communication paths described above in connection with communication paths 316 or 318. Communications with the social media server 302, editorial server 304, media content source 326 and media access control server 324 may be exchanged over one or more communications paths, but are shown as a single path in FIG. 3 to avoid overcomplicating the drawing. In addition, there may be more than one of each of social media server 302, editorial server 304, and media content source 326, but only one of each is shown in FIG. 3 to avoid overcomplicating the drawing. If desired, media content source 326 and media access control server 324 may be integrated as one source-server device. Although communications between the above-identified servers, sources, and devices are shown as through communications network 310, in some embodiments, such communications can be established directly through communications paths (not shown) such as those described above in connection with paths 316 and 318.

Social media server 302 may include one or more types of social media hosting systems including control circuitry for handling network traffic, databases, distributed datacenters, regional datacenters, and Internet service providers. The databases or datacenters may host real-time and archived data for social networking web sites, social networking applications, instant messaging applications, blogs, microblogs, podcasts, chat-rooms and forums, each of which may be publically accessible to a crawler for data mining. Details of the data mining function will be explained in connection with FIGS. 6 and 19. Content stored on social media server 302 may include data such as text, images, video, audio, or interactive content forms, and metadata for the stored data such as access history, title, size, date created, date modified, user-identifying information, and other suitable metadata as understood by one of ordinary skill in the art. Social media server 302 may exist in a location remote from any of the interactive user devices 306 or 308, editorial server 304, crowd-sourced data mining server 322 or media access control server 324. The stored data and metadata may be provided to the interactive user devices 306 or 308, crowd-sourced data mining server 322, or media access control server 324 using any suitable approach.

Editorial servers 304 may include control circuitry for handling network traffic, back-end databases, front-end user interface servers, and Internet service providers. The databases or datacenters may host real-time and archived data for editorial commentaries related to media assets, which may be publically accessible to a crawler for data mining. Content stored on editorial servers 304 may include data such as industry ratings for media, critique and commentaries made by industry ratings professionals, as well as metadata for the stored data such as revision history, date created, date modified, popularity rating, and reliability rating. Editorial server 304 may exist in a location remote from any of the interactive user devices 306, social media server 302, media content source 326, crowd-sourced data mining server 322 or media access control server 324. The stored content may be provided to the interactive user devices 306 or 308, crowd-sourced data mining server 322, or media access control server 324 using any suitable approach.

Media content source 326 may include one or more types of content distribution equipment, including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Media content source 326 may be the originator of content (e.g., a television broadcaster, a Webcast provider, etc.) or may not be the originator of content (e.g., an on-demand content provider, an Internet provider of content of broadcast programs for downloading, etc.). Media content source 326 may include cable sources, satellite providers, on-demand providers, Internet providers, over-the-top content providers, or other providers of content. Media content source 326 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media access control server 324 may include control circuitry, an I/O path, and a database. In some embodiments, media access control server 324 may also incorporate crowd-sourced data mining server 322, which may be located within or in close proximity to the media access control server 324 and may share the same communications path 334 with the media access control server 324. In other embodiments, the crowd-sourced data mining server may be independently coupled into communications network 310 via a dedicated communications path (not shown). Details of the structure and operation of media access control server 324 and crowd-sourced data mining server 322 will be made more apparent below in connection with FIG. 6.

Figure 4:
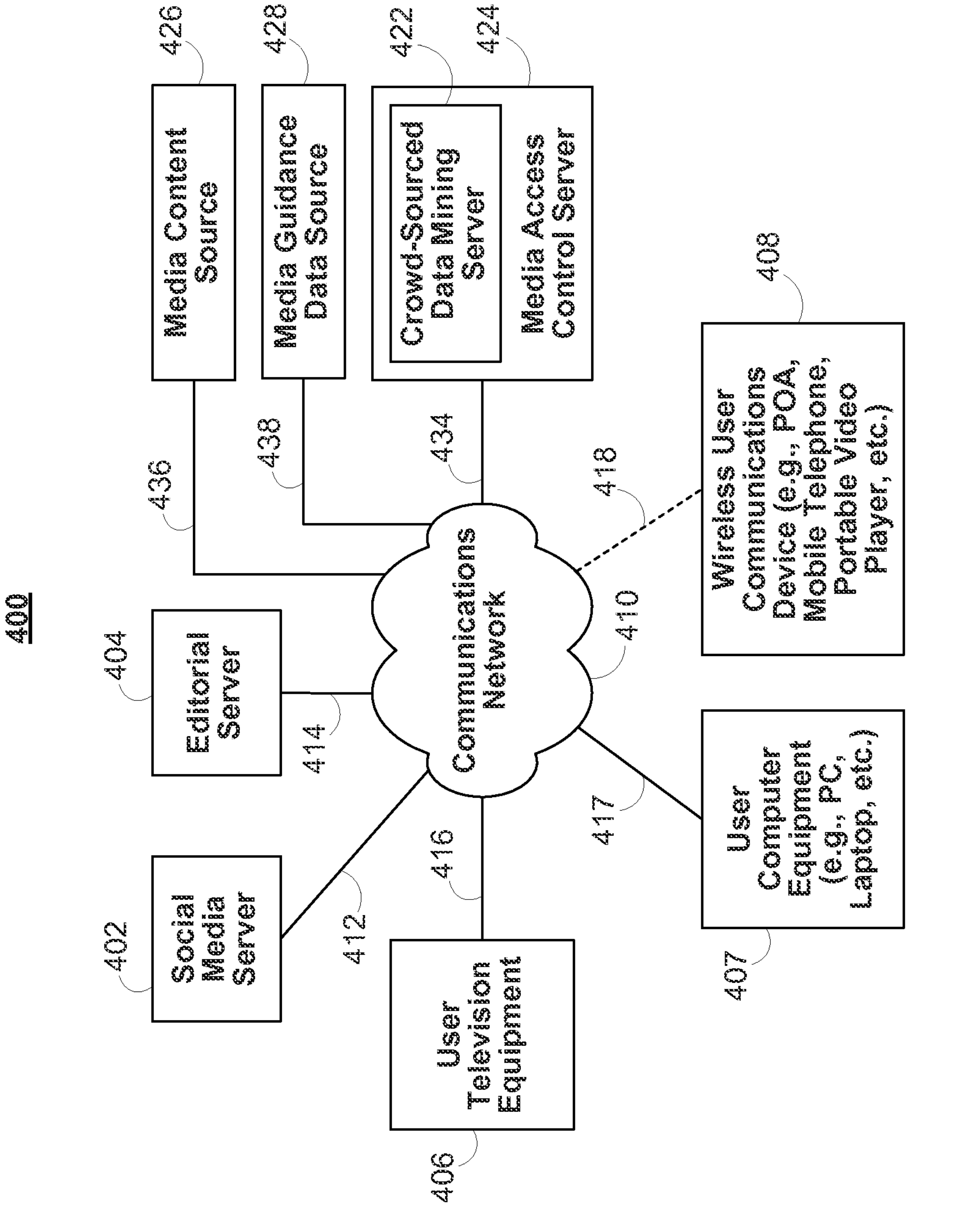
FIG. 4 is a diagram of an illustrative crowd-sourced access control system in the context of an interactive media guidance application in accordance with some embodiments of the disclosure.

FIG. 4 shows an exemplary embodiment of the present disclosure in the context of interactive media guidance systems. Interactive user devices 306 and 308 of FIG. 3 can be implemented in media guidance system 400 of FIG. 4 as user television equipment 406, user computer equipment 407, wireless user communications device 408, or any other types of user equipment suitable for accessing content, such as a non-portable gaming machine. For simplicity, these devices may be referred to herein collectively as user equipment or user equipment devices, and may be substantially similar to user equipment devices described above. User equipment devices, on which an interactive media guidance application may be implemented, may function as a stand-alone device or may be part of a network of devices. Various network configurations of devices may be implemented and are discussed in more detail below.

A user equipment device utilizing at least some of the system features described above in connection with FIG. 4 may not be classified solely as user television equipment 406, user computer equipment 407, or a wireless user communications device 408. For example, user television equipment 406 may, like some user computer equipment 407, be Internet-enabled allowing for access to Internet content, while user computer equipment 407 may, like some television equipment 406, include a tuner allowing for access to television programming. The media guidance application may have the same layout on various different types of user equipment or may be tailored to the display capabilities of the user equipment. For example, on user computer equipment 407, the guidance application may be provided as a web site accessed by a web browser. In another example, the guidance application may be scaled down for wireless user communications devices 408.

In media guidance system 400, there is typically more than one of each type of user equipment device but only one of each is shown in FIG. 4 to avoid overcomplicating the drawing. In addition, each user may utilize more than one type of user equipment device and also more than one of each type of user equipment device.

In some embodiments, a user equipment device (e.g., user television equipment 406, user computer equipment 407, wireless user communications device 408) may be referred to as a "second screen device." For example, a second screen device may supplement content presented on a first user equipment device. The content presented on the second screen device may be any suitable content that supplements the content presented on the first user equipment device. In some embodiments, the second screen device provides an interface for adjusting settings and display preferences of the first user equipment device. In some embodiments, the second screen device is configured for interacting with other second screen devices or for interacting with a social network. The second screen device can be located in the same room as the first user equipment device, a different room from the first user equipment device but in the same house or building, or in a different building from the first user equipment device. Second screen devices may communicate directly with social media server 402, editorial server 404, media content source 426, media guidance data source 428, crowd-sourced data mining server 422 or media access control server 424 in some embodiments. For example, the second screen devices may be coupled into communications network 410 through communications paths (e.g., similar to the communications paths 416-418 as described above.) The media guidance and media access control functions implemented on the second screen devices may then exchange information (e.g., requests and responses) with media access control server 424. In still other embodiments, a second screen device may only communicate with the above-mentioned servers and sources through another user equipment device. In such embodiments, a second screen device may or may not be coupled into communications network 410. However, the media guidance and media access control functions may only be implemented on the primary device, such that the second screen device would have to rely on the primary device to obtain information necessary to perform these functions.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment 406 and user computer equipment 407) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 410 via communications paths 416, 417 or 418. Each user of the user equipment devices may be associated with other users in a crowd of users. Communications network 410 may be one or more networks including the Internet, a mobile phone network, mobile voice or data network (e.g., a 4G or LTE cellular network), cable network, satellite telecommunication network, public switched telephone network, or other types of communications network or combinations of communications networks. Paths 416, 417 and 418 may include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combinations of such paths. Path 418 is drawn with dotted lines to indicate that in the exemplary embodiment shown in FIG. 4, it is a wireless path and paths 416 and 417 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn among user equipment devices, these devices may communicate directly with each other via communication paths, such as those described above in connection with paths 416, 417 and 418, as well as other short-range point-to-point communication paths, such as USB cables, IEEE 1394 cables, wireless paths, (e.g., Bluetooth, infrared, IEEE 802.11x, etc.), or other short-range communication via wired or wireless paths. BLUETOOTH is a certification mark owned by Bluetooth SIG, INC. The interactive user devices may also communicate with each other through an indirect path via communications network 410.

System 400 also includes social media server 402, editorial server 404, media content source 426, media guidance data source 428 and media access control server 424, coupled to communications network 410 via communication paths 412, 414, 436, 438 and 434, respectively. Paths 412, 414, 434, and 436 may include any of the communication paths described above in connection with communication path 416. Communications with the social media server 402, editorial server 404, media content source 426, media guidance data source 428, crowd-sourced data mining server 422 and media access control server 424 may be exchanged over one or more communications paths, but are shown as a single path in FIG. 4 to avoid overcomplicating the drawing. In addition, there may be more than one of each of social media server 402, editorial server 404, media content source 426, crowd-sourced data mining server 422 and media access control server 424, but only one of each is shown in FIG. 4 to avoid overcomplicating the drawing. If desired, media content source 426, media guidance data source 428 and media access control server 424 may be integrated as one source-server device 430. Although communications between the above-identified servers, source, and devices are shown as through communications network 410, in some embodiments, such communications can be established directly through communications paths (not shown) such as those described above in connection with path 416. The different types of each of these servers and source are discussed below.

Social media server 402 may include one or more types of social media hosting systems including processors for handling network traffic, databases, distributed datacenters, regional datacenters, and Internet service providers. The databases or datacenters may host real-time and archived data for social networking web sites, social networking applications, instant messaging applications, blogs, microblogs, podcasts, chat-rooms and forums, etc., which may be publically accessible to a crawler for data mining. Content stored on social media server 402 may include data such as text, images, video, audio, or interactive content forms, and metadata for the stored data such as access history, title, size, date created, date modified, user-identifying information, and other suitable metadata as understood by one of ordinary skill in the art. Social media server 402 may be remote from any of the user equipment devices (user television equipment 406, user computer equipment 407, wireless user communications device 408), editorial server 404, crowd-sourced data mining server 422, or media access control server 424. The stored data and metadata may be provided to the user equipment devices, crowd-sourced data mining server 422, or media access control server 424 using any suitable approach.

Editorial servers 404 may include processors for handling network traffic, backend databases, front-end user interface servers, and Internet service providers. The databases or datacenters may host real-time and archived data for editorial commentaries related to media assets, which may be publically accessible to a crawler for data mining. Content stored on editorial servers 404 may include data such as industry ratings for media, critique and commentaries made by industry ratings professionals, etc., and metadata for the stored data such as revision history, date created, date modified, popularity, and reliability. Editorial server 404 may exist in a location remote from any of the user equipment devices, social media server 402, crowd-sourced data mining server 422 or media access control server 424. The stored content may be provided to the user equipment devices, crowd-sourced data mining server 422, or media access control server 424 using any suitable approach.

Media content source 426 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Media content source 426 may be the originator of content (e.g., a television broadcaster, a Webcast provider, etc.) or may not be the originator of content (e.g., an on-demand content provider, an Internet provider of content of broadcast programs for downloading, etc.). Media content source 426 may include cable sources, satellite providers, on-demand providers, Internet providers, over-the-top content providers, or other providers of content. Media content source 426 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 428 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed).

Program schedule data and other guidance data may be provided to the user equipment on a television channel sideband, using an in-band digital signal, using an out-of-band digital signal, or by any other suitable data transmission technique. Program schedule data and other media guidance data may be provided to user's equipment on multiple analog or digital television channels.

In some embodiments, guidance data from media guidance data source 428 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 428 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 428 may provide user equipment devices 406, 407, and 408 the media guidance application itself or software updates for the media guidance application.

Media guidance applications may be, for example, standalone applications implemented on user equipment devices. For example, the media guidance application may be implemented as software or a set of executable instructions which may be stored in storage 508, and executed by control circuitry 504 of a user equipment device 500. In some embodiments, media guidance applications may be client-server applications where only a client application resides on the user equipment device, and server application resides on a remote server. For example, media guidance applications may be implemented partially as a client application on control circuitry 504 of user equipment device 500 and partially on a remote server as a server application (e.g., media guidance data source 428) running on control circuitry of the remote server. When executed by control circuitry of the remote server (such as media guidance data source 428), the media guidance application may instruct the control circuitry to generate the guidance application displays and transmit the generated displays to the user equipment devices. The server application may instruct the control circuitry of the media guidance data source 428 to transmit data for storage on the user equipment. The client application may instruct control circuitry of the receiving user equipment to generate the guidance application displays.

Media access control server 424 may include control circuitry, an I/O path, and a database. In some embodiments, media access control server 424 may also incorporate crowd-sourced data mining server 422, which may be located within or in close proximity to the media access control server 424 and may share the same communications path 434 with the media access control server 424. In other embodiments, the crowd-sourced data mining server may be independently coupled into communications network 410 via a dedicated communications path (not shown).

Figure 19:
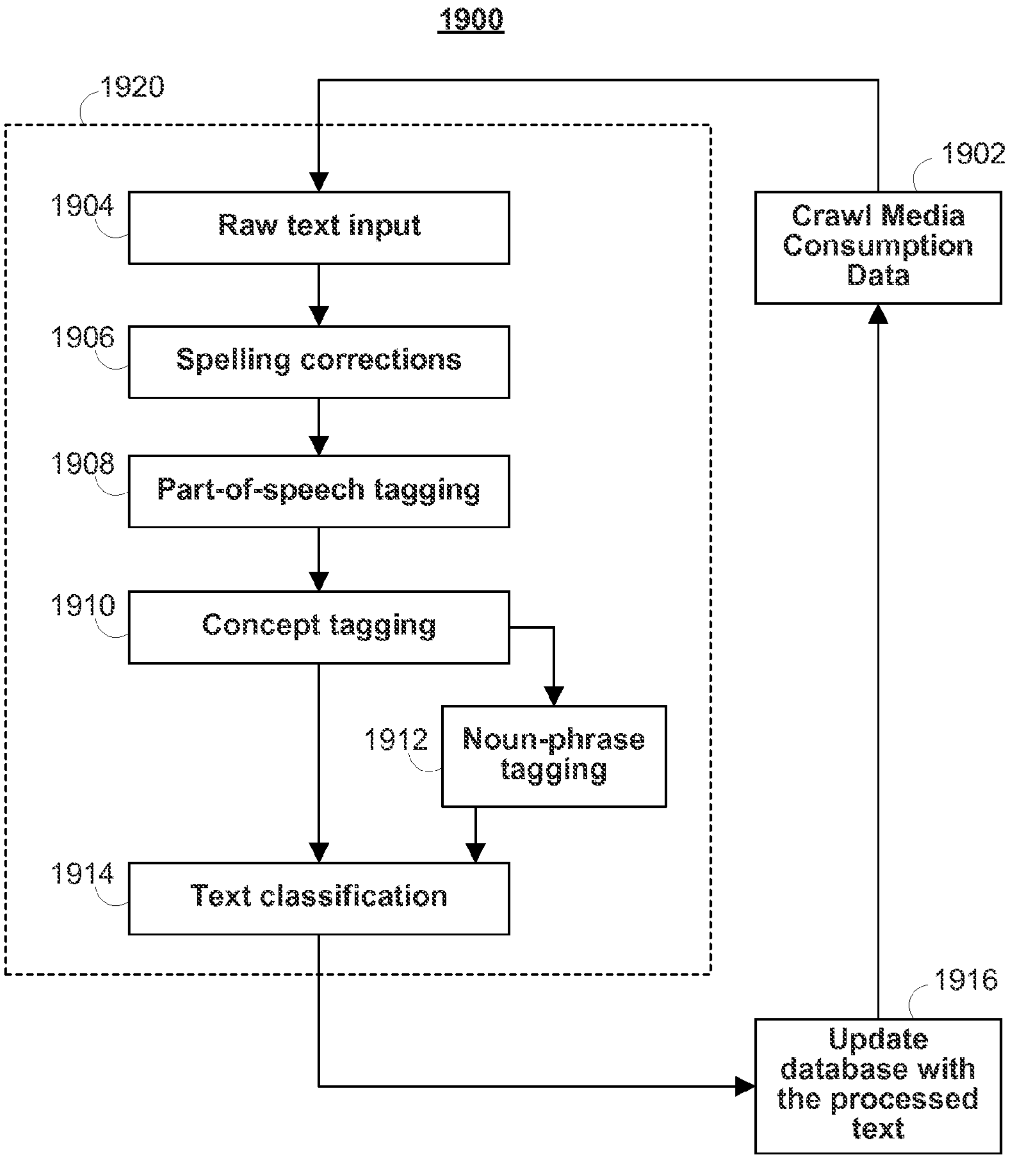
FIG. 19 is a flow diagram of an illustrative process for processing media consumption data from multiple sources in accordance with some embodiments of the disclosure.

The aforementioned access control function may be implemented, at least in part, on media access control server 424. The media access control server 424 aggregates media consumption data from social media server 402, editorial server 404, and user equipment devices. In some embodiments, the media consumption data are first processed by crowd-sourced data mining server 422 following any suitable natural language parsing mechanism, an exemplary embodiment of which is shown in FIG. 19. The aggregated data may be stored in a database in an appropriate format (e.g., as media access control data of FIG. 9) and ready for queries from user equipment devices. In a client-server architecture where a client application resides on a user equipment device, the client-side access control function may be integrated into the media guidance application in order to create a streamlined experience. For example, as part of the media guidance application running on a user equipment device and in response to a user request for a media asset, a query for access control data may be sent to media access control server 424 in relation to the media asset requested. Exemplary embodiments of the operations of media access control server 424 will be described in relation to FIG. 16. Furthermore, details of the structure of media access control server 424 and crowd-sourced data mining server 422 will be made more apparent below in connection with FIG. 6.

Media assets or media guidance data delivered to user equipment devices 406, 407, and 408 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 400 is intended to illustrate a number of approaches, or network configurations, by which user equipment devices and sources of content, access control and guidance data may communicate with each other for the purpose of accessing content and providing media guidance. The embodiments described herein may be applied in any one or a subset of these approaches, or in a system employing other approaches for delivering content and providing access control data and media guidance. The following four approaches provide specific illustrations of the system in FIG. 4.

In one approach, user equipment devices may communicate with each other within a home network. User equipment devices can communicate with each other directly via short-range point-to-point communication schemes described above, via indirect paths through a hub or other similar device provided on a home network, or via communications network 410. Each of the multiple individuals in a single home may operate different user equipment devices on the home network. As a result, it may be desirable for various media guidance information, access control data or settings to be communicated between the different user equipment devices. For example, it may be desirable for users to maintain consistent media guidance application settings on different user equipment devices within a home network, as described in greater detail in Ellis et al., U.S. patent application Ser. No. 11/179,410, filed Jul. 11, 2005. As another example, media access control function may rely on user profile information that is synchronized among several user equipment devices. Different types of user equipment devices in a home network may also communicate with each other to transmit content and user data, such as clickstream data corresponding to a usage history. For example, a user may transmit content from user computer equipment to a portable video player or portable music player, as well as his or her own usage history.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a web site via a personal computer at their office, or a mobile device such as a PDA or web-enabled mobile telephone. The user may set various settings (e.g., recordings, reminders, media access control, or other settings) on the online guidance application to control the user's in-home equipment. The online guide may control the user's equipment directly, or by communicating with a media guidance application on the user's in-home equipment. For example, media access control function implemented on the remote device may be used to modify the parental control settings on the user's in-home equipment. In some embodiments, separate media access control functions can be implemented, for example, in a master-slave architecture. In such systems, a media access control function implemented on the remote device may have a different set of settings than those on the user's in-home equipment (e.g., additional parental control settings on a child's iPad, on top of the universal parental control settings configured on the parents' in-home equipment.) Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 426 to access content and with media access control server 424 to receive updated access control data. Specifically, within a home, users of user television equipment 406 and user computer equipment 407 may access the media guidance application to navigate among and locate desirable content. Users may also access the media guidance application outside of the home using wireless user communications devices 408 to navigate among and locate desirable content. In each scenario, the corresponding user equipment device may attempt to obtain access control data directly from media access control server 424 prior to accessing the located content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 410. These cloud resources may include one or more content sources 416, one or more media access control servers 424 and one or more media guidance data sources 418. In addition or in the alternative, the remote computing sites may include other user equipment devices, such as user television equipment 406, user computer equipment 407, and wireless user communications device 408. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, media access control, or social networking services, among other examples, as well as access to any content described above, for user equipment devices. Services can be provided in the cloud through cloud computing service providers, or through other providers of online services. For example, the cloud-based services can include a content storage service, a content sharing site, a media access control service, a social networking site, or other services via which user-sourced content is distributed for viewing by others on connected devices. These cloud-based services may allow a user equipment device to store content or access control data to the cloud and to receive content or access control data from the cloud rather than storing them locally and accessing locally-stored data.

A user may use various content capture devices, such as camcorders, digital cameras with video mode, audio recorders, mobile phones, and handheld computing devices, to record content. The user can upload content to a content storage service on the cloud either directly, for example, from user computer equipment 407 or wireless user communications device 408 having content capture feature. Alternatively, the user can first transfer the content to a user equipment device, such as user computer equipment 407. The user equipment device storing the content uploads the content to the cloud using a data transmission service on communications network 410. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by control circuitry described in relation to FIG. 3. As an example, media access control function can be provided to user equipment devices via a cloud-based media access control server. A user's parental control settings can be stored in the cloud to be accessed and shared by all network-accessible user equipment devices that the user owns. As a result, the user can be provided with a unified guidance application experience across the user's different user equipment devices.

So far, media access control data has been discussed in view of a client-server-based architecture involving user equipment devices and media access control server 424. This by no means precludes other embodiments of system 400 as will be illustrated below. For example, user equipment devices may communicate and exchange media consumption data in a distributed manner (without a centralized server), and each processes the received media consumption data locally. The processed media consumption data can then be used in a similar manner as the regular media access control data as received from media access control server 424. The data structures of media consumption data and media access control data are discussed in further detail in relation to FIGS. 7-9.

Figure 5:
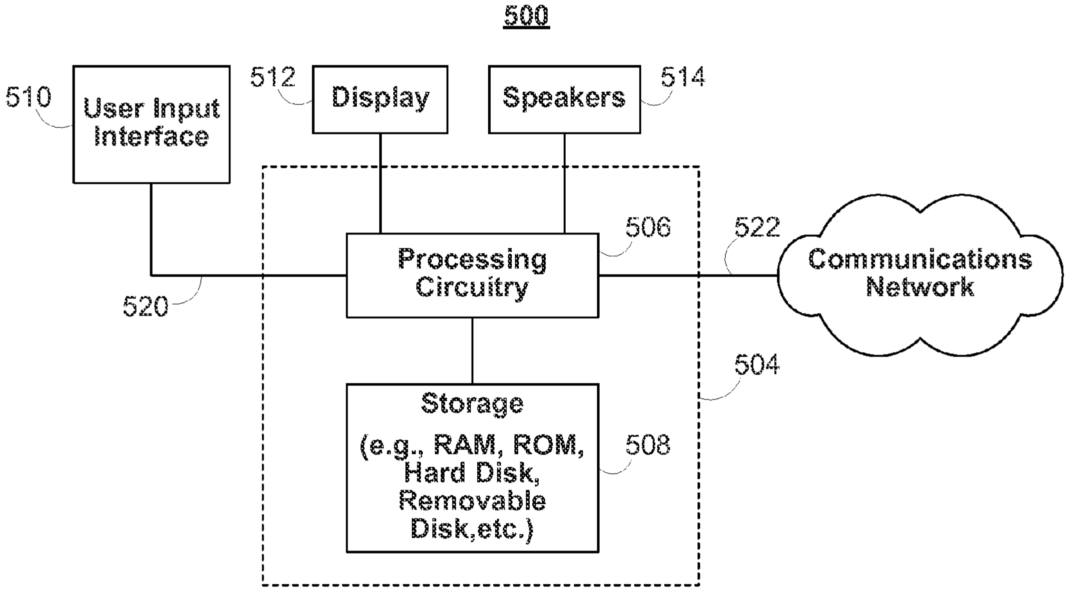
FIG. 5 shows an illustrative user equipment device in accordance with some embodiments of the disclosure.

Users may access content and the media guidance application (of which the media access control function may be part) from one or more of their user equipment devices. FIG. 5 shows a generalized embodiment of illustrative user equipment device 500. Specific examples of user equipment device 500 have been provided above in connection with FIG. 4 (e.g., user television equipment 406, user computer equipment 407, wireless user communications device 408.) User equipment device 500 may receive content and data via I/O path 522. I/O path 522 may provide content (e.g., broadcast programming, on-demand programming, Internet content, content available over a local area network (LAN) or wide area network (WAN), and/or other content) and data to control circuitry 504, which includes processing circuitry 506 and storage 508. Control circuitry 504 may be used to send and receive commands, requests, and other suitable data using I/O path 522. I/O path 522 may connect control circuitry 504 (and specifically processing circuitry 506) to one or more communications paths (described below). I/O functions may be provided by one or more of these communications paths, but are shown as a single path in FIG. 5 to avoid overcomplicating the drawing.

Control circuitry 504 may be based on any suitable processing circuitry such as processing circuitry 506. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). Intel and Intel Core are trademarks owned by Intel Corporation. In some embodiments, control circuitry 504 executes instructions for a media guidance application stored in memory (i.e., storage 508). Specifically, control circuitry 504 may be instructed by the media guidance application to perform the functions discussed above and below. For example, the media guidance application may provide instructions to control circuitry 504 to generate the media guidance displays. In some implementations, any action performed by control circuitry 504 may be based on instructions received from the media guidance application.

In client-server based embodiments, control circuitry 504 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which have been described in more detail in connection with FIGS. 3 & 4). In addition, communications circuitry may include circuitry that enables peer-to-peer communication of user equipment devices, or communication of user equipment devices in locations remote from each other (also described in FIGS. 3 & 4).

Memory may be an electronic storage device provided as storage 508 that is part of control circuitry 504. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 508 may be used to store various types of content described herein as well as media guidance data and guidance application data that are described above. Nonvolatile memory may also be used (e.g., to launch a boot-up routine and other instructions). Cloud-based storage, described in relation to FIG. 4, may be used to supplement storage 508 or instead of storage 508.

Control circuitry 504 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 504 may also include scaler circuitry for upconverting and downconverting content into the preferred output format of the user equipment 500. Circuitry 504 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 508 is provided as a separate device from user equipment 500, the tuning and encoding circuitry (including multiple tuners) may be associated with storage 508.

A user may send instructions to control circuitry 504 using user input interface 510. User input interface 510 may be any suitable user interface, such as a remote control, mouse, trackball, keypad, keyboard, touch screen, touchpad, stylus input, joystick, voice recognition interface, or other user input interfaces. Display 512 may be provided as a stand-alone device or integrated with other elements of user equipment device 500. For example, display 512 may be a touchscreen or touch-sensitive display. In such circumstances, user input interface 512 may be integrated with or combined with display 512. Display 512 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 512 may be HDTV-capable. In some embodiments, display 512 may be a 3D display, and the interactive media guidance application and any suitable content may be displayed in 3D. A video card or graphics card may generate the output to the display 512. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 504. The video card may be integrated with the control circuitry 504. Speakers 514 may be provided as integrated with other elements of user equipment device 500 or may be stand-alone units. The audio component of videos and other content displayed on display 512 may be played through speakers 514. In some embodiments, the audio may be distributed to a receiver (not shown), which processes and outputs the audio via speakers 514.

The guidance application may be implemented using any suitable architecture. For example, it may be a stand-alone application wholly implemented on user equipment device 500. In such an approach, instructions of the application are stored locally (e.g., in storage 508), and data for use by the application is downloaded on a periodic basis (e.g., from an out-of-band feed, from an Internet resource, or using another suitable approach). Control circuitry 504 may retrieve instructions of the application from storage 508 and process the instructions to generate any of the displays discussed herein. Based on the processed instructions, control circuitry 504 may determine what action to perform when input is received from input interface 510. For example, movement of a cursor on a display up/down may be indicated by the processed instructions when input interface 510 indicates that an up/down button was selected.

In some embodiments, the media guidance application is a client-server based application. Data for use by a thick or thin client implemented on user equipment device 500 is retrieved on-demand by issuing requests to a server remote to the user equipment device 500. In one example of a client-server based guidance application, control circuitry 504 runs a web browser that interprets web pages provided by a remote server. For example, the remote server may store the instructions for the application in a storage device. The remote server may process the stored instructions using circuitry (e.g., control circuitry 504) and generate the displays discussed above and below. The client device may receive the displays generated by the remote server and may display the content of the displays locally on equipment device 500. This way, the processing of the instructions is performed remotely by the server while the resulting displays are provided locally on equipment device 500. Equipment device 500 may receive inputs from the user via input interface 510 and transmit those inputs to the remote server for processing and generating the corresponding displays. For example, equipment device 500 may transmit a communication to the remote server indicating that an up/down button was selected via input interface 510. The remote server may process instructions in accordance with that input and generate a display of the application corresponding to the input (e.g., a display that moves a cursor up/down). The generated display is then transmitted to equipment device 300 for presentation to the user.

In some embodiments, the media guidance application is downloaded and interpreted or otherwise run by an interpreter or virtual machine (run by control circuitry 504). In some embodiments, the guidance application may be encoded in the ETV Binary Interchange Format (EBIF), received by control circuitry 304 as part of a suitable feed, and interpreted by a user agent running on control circuitry 504. For example, the guidance application may be an EBIF application. In some embodiments, the guidance application may be defined by a series of JAVA-based files that are received and run by a local virtual machine or other suitable middleware executed by control circuitry 504. In some of such embodiments (e.g., those employing MPEG-2 or other digital media encoding schemes), the guidance application may be, for example, encoded and transmitted in an MPEG-2 object carousel with the MPEG audio and video packets of a program. In other embodiments, the guidance application may be implemented on the user equipment device 500 that are connected to other user equipment devices in a distributed network. Content, media guidance data and access control data may be dynamically rippled through the distributed network without having a centralized server coordinating this action.

Figure 6:
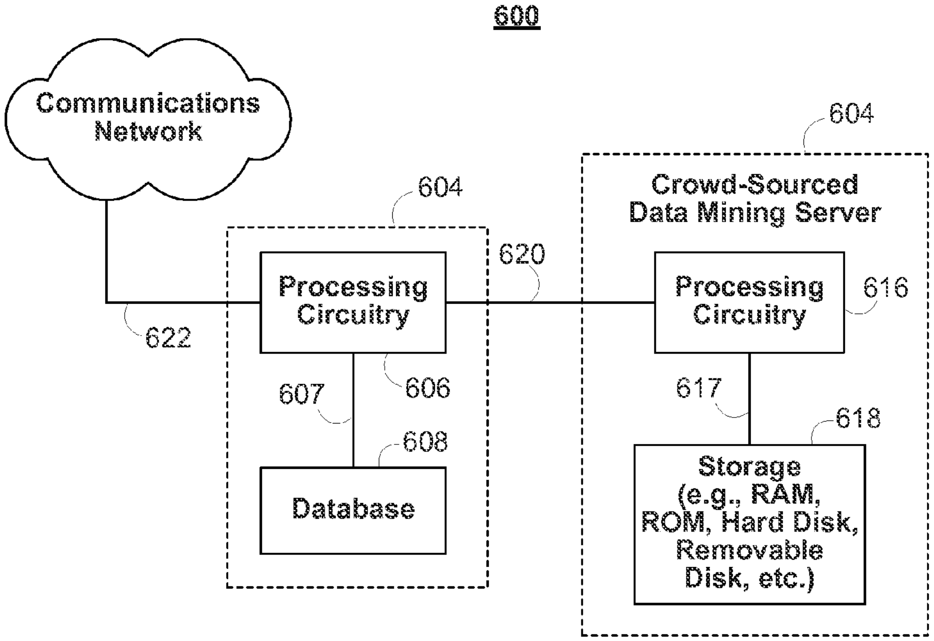
FIG. 6 shows an illustrative media access control server in accordance with some embodiments of the disclosure.

FIG. 6 shows an illustrative embodiment of media access control server. Media access control server 600 may receive, on I/O path 622, (1) requests from user equipment devices; and (2) media consumption data from social media server 402, editorial server 404 or user equipment devices. The requests from user equipment devices may include attributes of users, attributes of media assets which users have requested, and local access control settings such as an access control threshold for crowd-sourced media access control data. The data structure of an exemplary request from user equipment device is described below in relation to FIG. 8. In response to the requests from user equipment devices, media access control server 600 may provide, on I/O path 622, (1) media access control data as stored in database 608; or (2) access permission calculated based at least partially on media access control data. An exemplary embodiment of the response from media access control server 600 is described below in relation to FIG. 8 as well. Control circuitry 604 may be used to send and receive commands, requests, and other suitable data using I/O path 622. I/O path 622 may connect control circuitry 604 (and specifically processing circuitry 606) to one or more communications paths (described below). I/O functions may be provided by one or more of these communications paths, but are shown as a single path in FIG. 6 to avoid overcomplicating the drawing.

Control circuitry 604 may be based on any suitable processing circuitry such as processing circuitry 606. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). Intel and Intel Core are trademarks owned by Intel Corporation. In some embodiments, control circuitry 604 maintains the operation of database 608 in accordance with the instructions of a media access control function as stored in memory. Specifically, control circuitry 604 may be instructed by the media access control function to perform the functions discussed above and below. For example, the media access control function may provide instructions to control circuitry 604 to retrieve and aggregate media consumption data from social media server 402, editorial server 404, and user devices, and update data stored in database 608 accordingly. In some implementations, any action performed by control circuitry 604 may be based on instructions received from the media access control function.

In client-server based embodiments, control circuitry 604 may include communications circuitry suitable for communicating with a client media guidance application or client access control function on user equipment devices or other networks or devices. The instructions for carrying out the above mentioned functionality may be stored at least partially on the user equipment devices. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which have been described in more detail in connection with FIGS. 3 & 4). In addition, communications circuitry may include circuitry that enables peer-to-peer communication with user equipment devices, or communication with user equipment devices in locations remote from media access control server 600 (also described in FIGS. 3 & 4).

Memory may be an electronic storage device that includes database 608, which is part of control circuitry 604. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Nonvolatile memory may also be used (e.g., to launch a boot-up routine and other instructions). Cloud-based storage, described in relation to FIG. 4, may be used to supplement, or instead of, memory as described above. In some embodiments, database 608 may be used to store media access control data, as parsed by data mining processor 602. Database 608 may be implemented as a relational database, a non-relational database, or any other suitable implementations as understood by one of ordinary skill in the art.

Media access control server 600 may include crowd-sourced data mining server 602 for performing data mining function. In some embodiments, the data mining function may involve natural language processing on media consumption data as received from social media server 402, editorial server 404, or user equipment devices. Crowd-sourced data mining server 602 may employ one or more additional processing units and operate with processing circuitry 606 in a master-slave architecture. In such an architecture, processing circuitry 616 of crowd-sourced data mining server 602 may operate under commands and instructions issued from processing circuitry 606, according to the media access control function. For example, processing circuitry 616 may actively crawl multiples sources (e.g., social media server 402, editorial server 404, and user devices) for media consumption data. Additionally, processing circuitry 616 may perform natural language processing on received media consumption data according to the data mining function. FIG. 19 below is an illustrative example of the steps involved in carrying out the data mining function according to some embodiments of the disclosure. Furthermore, processing circuitry 616 may temporarily store retrieved media consumption data, or instructions as received from the master processing circuitry (e.g., processing circuitry 606) in local storage 618 via internal bus 617. Data stored in storage 618 may eventually be transferred to into database 608 via internal buses (e.g., buses 617, 620, and 607), or they may be erased locally. In some embodiments, data mining processor may parse media consumption data into media access control data which can be indexed into database 608 by attributes, such as user attribute value. Details of media access control data as stored in database 608 are described below in relation to FIG. 9.

FIG. 7 shows an illustrative example of a data structure that may be used to transmit data to media access control server 600. The transmitted data may be associated with crowd-sourced media consumption information in accordance with some embodiments of the disclosure. For example, data structures 700, 710, 730 and 750 may represent data generated by one or more of social network server 402, editorial server 404, and user equipment devices (e.g., user television equipment 406, user computer equipment 407, and wireless user communications device 408.) Media access control server 600 may process the data structures in FIG. 7 to determine whether a media asset has been accessed, a user associated with one or more user attributes has requested a media asset, a user has successfully accessed a media asset, a user has claimed to have accessed a media asset, a user has commented on a media asset, a media asset may be associated with one or more media attributes, or a comment has been made in relation to users having a particular user attribute and media assets having a particular media attribute. In particular, a media attribute may be any information used to describe or identify a media asset, such as title, description, content rating, and genre. A user attribute may be any information used to describe or identify a user, such as age, age group, gender, profession, citizenship, marital status, security level, and priority level.

Data structures in FIG. 7 include multiple fields, which, in some embodiments, may include one or more lines of code for describing data and issuing instructions. For example, fields 712 through 724 indicate to the media access control server 600 that data contained in data structure 710 is relevant to female, teenage users. It should be noted that the data (e.g., represented by the various fields) in data structure 700 is not limiting, and in some embodiments, the data as described in data structure 700 may be replaced or supplemented by other data as discussed in the disclosure.

Fields 702 through 708 relate to data describing media assets that have a particular media attribute (e.g., media asset is from the "history channel"), as well as data describing users that have a particular user attribute (e.g., "kids under 16".) Field 704 further indicates that this data was retrieved from www.mysocialnetwork.com, a social networking web site where users may share information with the general public. In some embodiments, Field 706 may first be processed by a data mining function in order to parse the natural language into identifiable keywords. Crowd-sourced data mining server 422 may carry out the data mining function by processing media consumption data into machine-identifiable keywords (e.g., media access control data) that may be entered into database 608. An illustrative data structure of media access control data will be described below in relation to FIG. 9, and the process of data mining function is described in further detail in connection with FIG. 19.

As another example, fields 712 to 724 indicate that an editorial ratings professional does not recommend users who are female teenagers to consume media assets having a media attribute "teen moms". This data may be entered into database 608 without first being processed by crowd-sourced data mining server 602, as no natural language processing appears to be necessary. In this example, media consumption data may be transcribed into a suitable format (e.g., media access control data) and stored into database 608 directly. Details of this "transcription" process is discussed in further detail in connection with FIG. 19.

The SOURCE field in data structures of FIG. 7 may be used to indicate the origin of the data obtained, for example, the source may be a server, an address, a publication, a person, or a Universal Resource Identifier (URI). Various other fields in the data structures may be used to describe or identify a user, such as age, age group, gender, profession, citizenship, marital status, security level, and priority level. Still other fields in the data structures may be used to describe or identify a media asset, such as title, genre, media rating, content keywords, performers, release date etc. The DATUMx field (where x may be one or more alphanumeric symbols used to differentiate different DATUM fields) can be any data or pieces of information that may be retrieved from the corresponding SOURCE in relation to the user or media asset of interest. Data shown under the DATUMx fields (e.g., field 706) in data structure 700 is text-based, however, it is understood to one of ordinary skill in the art that data here may also refer to any combination of multimedia data including video, audio, and images.

FIG. 8 shows illustrative data structures indicating a request and a response between user equipment devices (e.g., user television equipment 406, user computer equipment 407, wireless user communications device 408) and media access control server 424. When a user of user equipment device requests access to a media asset, the user equipment device may send a request to media access control server 424 in order to determine if access should be granted.

Data structure 800 includes multiple fields, which, in some embodiments, may include one or more lines of code for describing data and issuing instructions. For example, fields 802 through 814 indicate to media access control function that the user of user equipment device has requested access to a media asset titled ANCIENT NINJA WEAPONS. In addition, a crowd-sourced access control option (e.g., field 1312 of display screen 1300) stipulates that the user may only be granted permission to access the media asset if other users belonging to the age group "12-15" have also been allowed to access the media asset, or a similar media asset. Field 812 further indicates that the threshold level for determining whether access permission should be granted has been configured for the user at level "2". Threshold level in field 812 can be configured on a user equipment device as part of the crowd-sourced access control option, as will be described in further detail in relation to FIGS. 13 and 18. In some embodiments, the threshold level 2 may correspond to an access control threshold used by media access control function in making a permission decision. The access control thresholds (e.g., threshold value 1314) may indicate a statistical importance based on access permission decisions of other users. For example, threshold level 2 may correspond to the criteria that more than 50% of other users (belonging to the same age group) have also been granted permission or have recommended granting permission to access the media asset. If this threshold has not been met, a permission decision may be made indicating that access is denied. This permission decision may be received by user equipment device to complement or replace existing access control information that is available to the user equipment device. As another example, threshold level x may correspond to the criteria that at least some other users (belonging to a same fan group) have accessed or recommended accessing a media. Once this threshold has been met, a user may henceforth be allowed to access a similar media. Exemplary operations of this process will be described below in relation to FIGS. 16-18.

Fields such as "title" or "genre" may be substantially similar to descriptions of similar fields in relation to fields in FIG. 7 above. A field in illustrative data structures 800 and 820 may be associated with attributes of a user or a media asset. For example, the request as described by illustrative data structure 800 indicates to a server (e.g., media access control server 600) that a male user aged between 12-15 has requested access to a media asset titled ANCIENT NINJA WEAPONS, which belongs to the history genre.

Figure 16:
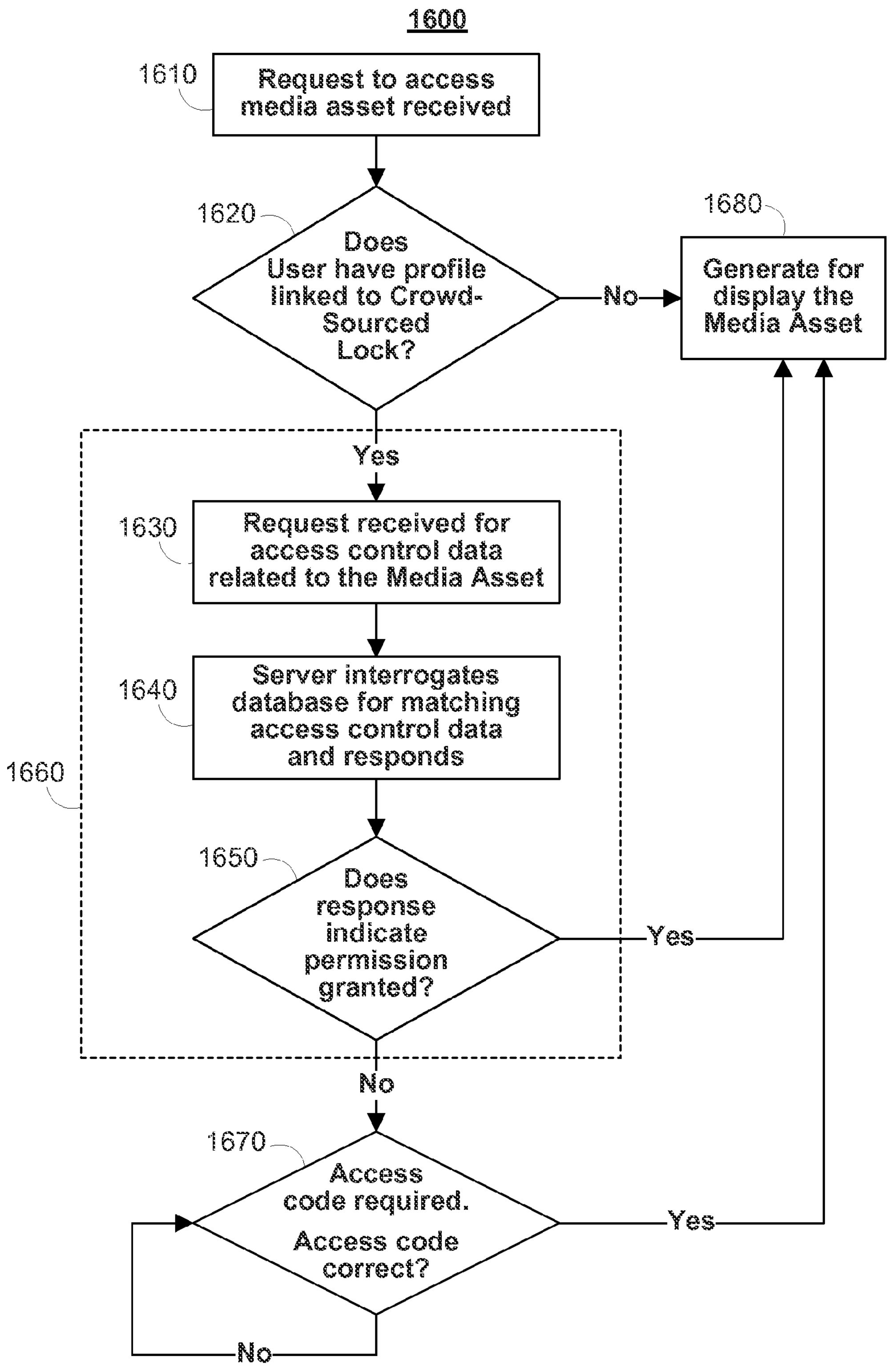
FIG. 16 is a flow diagram of an illustrative process for implementing crowd-sourced media access control on a media access control system in accordance with some embodiments of the disclosure.
Figure 17:
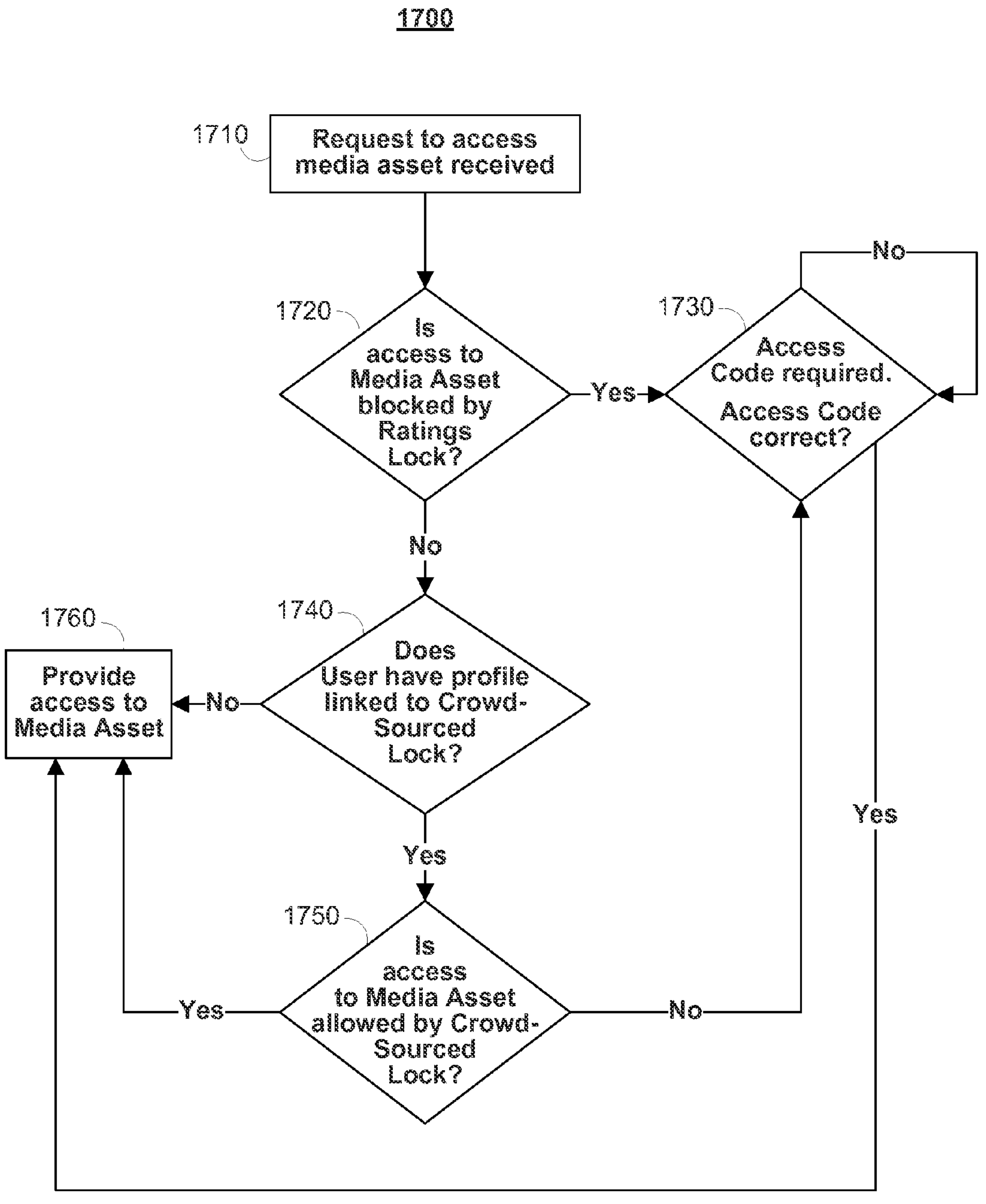
FIG. 17 is a flow diagram of an illustrative process for implementing crowd-sourced media access control in a media guidance system in accordance with some embodiments of the disclosure.
Figure 18:
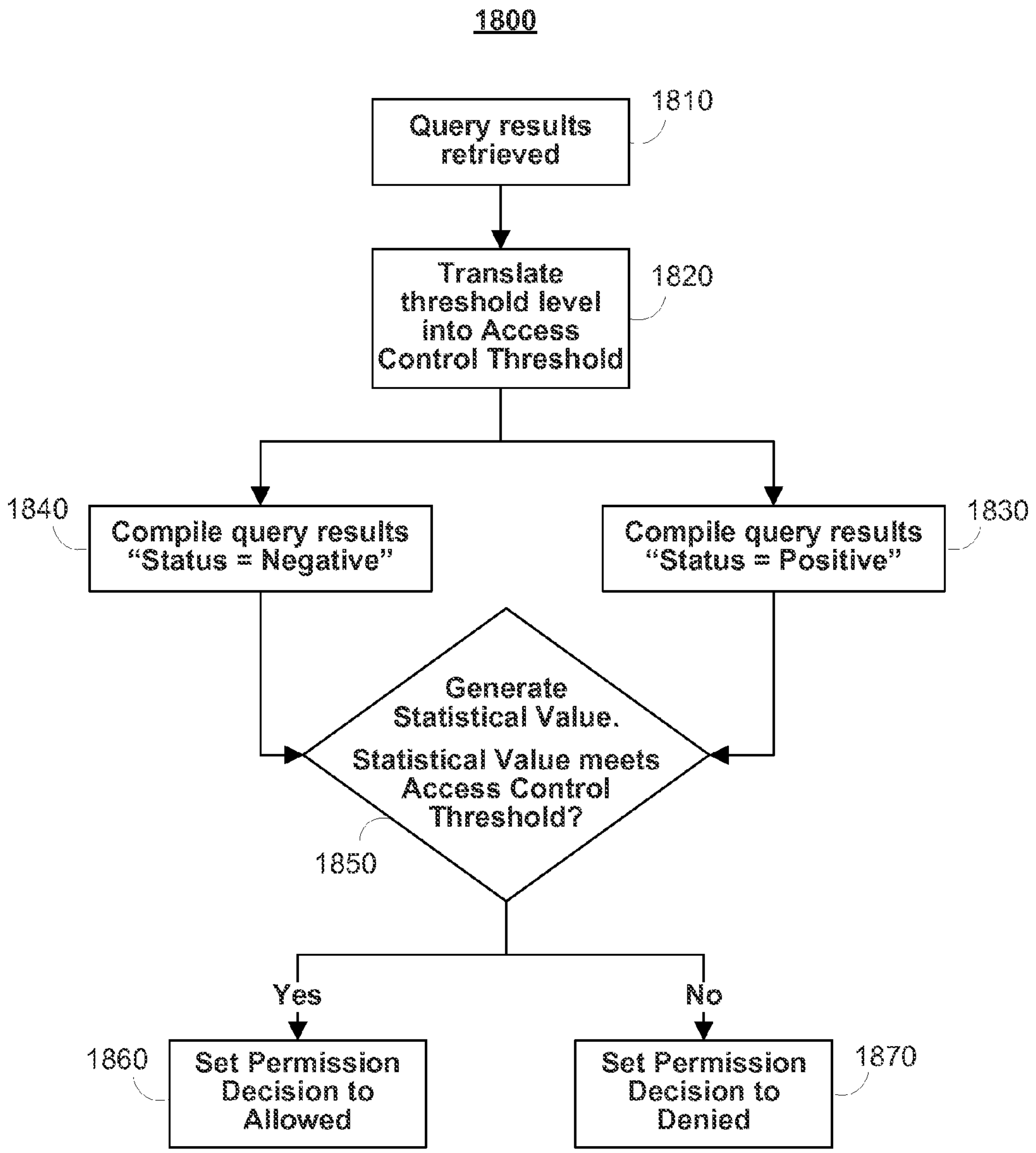
FIG. 18 is a flow diagram of an illustrative process for determining if retrieved media access control information meets a threshold in accordance with some embodiments of the disclosure.

In response to receiving the request from a user equipment device, the server may perform suitable operations on the received data from data structure 800 (e.g., as illustrated in FIGS. 16-18) and send a reply (data structure 840) to the user equipment device. In some embodiments, control circuitry (e.g., control circuitry 604) may query a database (e.g., database 608) to retrieve data relevant to fields of the request data structure 800. The query may be conducted in accordance with the process described in relation to FIGS. 16-17. A number of media attributes from request data structure 800 may be used in the query in order to ensure that only relevant data is retrieved from the database. For example, data structure 800 concerns a media asset that has the genre "history", so that media assets that are songs titled ANCIENT NINJA WEAPONS will not be retrieved. The control circuitry (e.g., control circuitry 604) may further compile the retrieved data into a reply data structure 840. Data structure 840 includes multiple fields, which, in some embodiments, may include one or more lines of code for describing data and issuing instructions. For example, fields 842 through 846 may indicate to the user equipment device that permission has been denied based on the data stored in database 608 as well as data in the request data structure 800. Alternative data structures may exist for transmitting a response from media access server 600 to user equipment devices. For example, instead of including only the PERMISSION field in a response, the control circuitry may include into the response data structure the "raw" data as stored in database 608 (e.g., media access control data, which is described below in relation to FIG. 9). An illustrative example of a response in this format is shown in data structure 860, which is generated in response to illustrative request data structure 820. Illustrative communications between media access control server 600 and user equipment devices will be described in further detail in relation to FIGS. 16-18.

FIG. 9 is an illustrative example of a data structure that may be used to store access control information that has been retrieved and processed by control circuitry (e.g., control circuitry 604), in accordance with some embodiments of the disclosure. For example, data structure 900 may be indexed into database 608, and may substantially contain the same information as media consumption data (e.g., data structure 700) received by media access control receiver, as described in relation to FIG. 7 above. In some embodiments, data structure 900 may represent an output from a data mining server (e.g., crowd-sourced data mining server 602, which is then indexed into database 608.

Data structure 900 includes multiple fields, which, in some embodiments, may include one or more lines of code for describing data and issuing instructions. For example, fields 902 through 914 may indicate to the media access control function that data structure 900 relates to a user younger than 16 years old and the user's attempted access to the history media asset about weapons and ninja, which was not granted. It should be noted that the data (e.g., represented by the various fields) in data structure 900 is not limiting, and in some embodiments, the data as described in data structure 900 may be replaced or supplemented by other data as discussed in the disclosure.

In accordance with some embodiments of the present disclosure, fields 902-914 may be populated based on an output from crowd-sourced data mining server 602. For example, crowd-sourced data mining server 602 may perform data mining function (e.g., statistical natural language processing) on media consumption data (e.g., data structure 700) received from social media server 402. Further details of this process are illustrated in relation to FIG. 19.

Fields 902 through 918 relate to a user's access of a media asset. In this example, the accessing user's age of interest is younger than 16 ("15 and under"); the media asset being accessed belongs to the "history" genre, and the content of the media asset is about "weapons" and "ninja". A STATUS field may indicate a recommendation, a user comment, an outcome of an attempted access, or any other suitable status of the record. Collectively, fields 902-918 indicate that the attempted access to a history media about weapons by the 15-year-old user was "negative", or not successful.

As discussed before, media consumption data as described in FIG. 7 may be processed and transcribed into a suitable format for storing in database 608. Fields in media consumption data may first be processed by a data mining function to produce machine-identifiable keywords, as described above in relation to FIG. 7. Thereafter, fields and keywords may be transcribed into a data structure similar to data structure 900. For example, field 710 in FIG. 7 may be processed by data mining function into a series of keywords such as "weapons", "history", "inappropriate" and "15". These keywords may then be compiled into a data structure for media access control data, such as data structure 900. Data structure 900 may then be indexed into database 608 by any one or more of fields 902 through 914, so that information stored in data structure 900 can be retrieved, polled, deleted, or otherwise operated on easily.

In some embodiments, data structure 900 may be used in computing a decision by a media access control function implemented on a server (e.g., media access control server 600). The decision computed may be embedded in a response to requests from user equipment devices, such as data structure 850 as described above in relation to FIG. 8. In other embodiments, a data structure in FIG. 9 (e.g., data structure 920 or 940) itself may instead be delivered, in part or in its entirety, to user equipment devices as part of a response to requests from user equipment devices (e.g., data structure 860). For example, information contained in illustrative datas structures 920 and 940 are shown to be embedded in data structure 860 in FIG. 8. This response may be used to derive a permission decision for access control, according to processes described in FIGS. 16-18.

Figure 10:
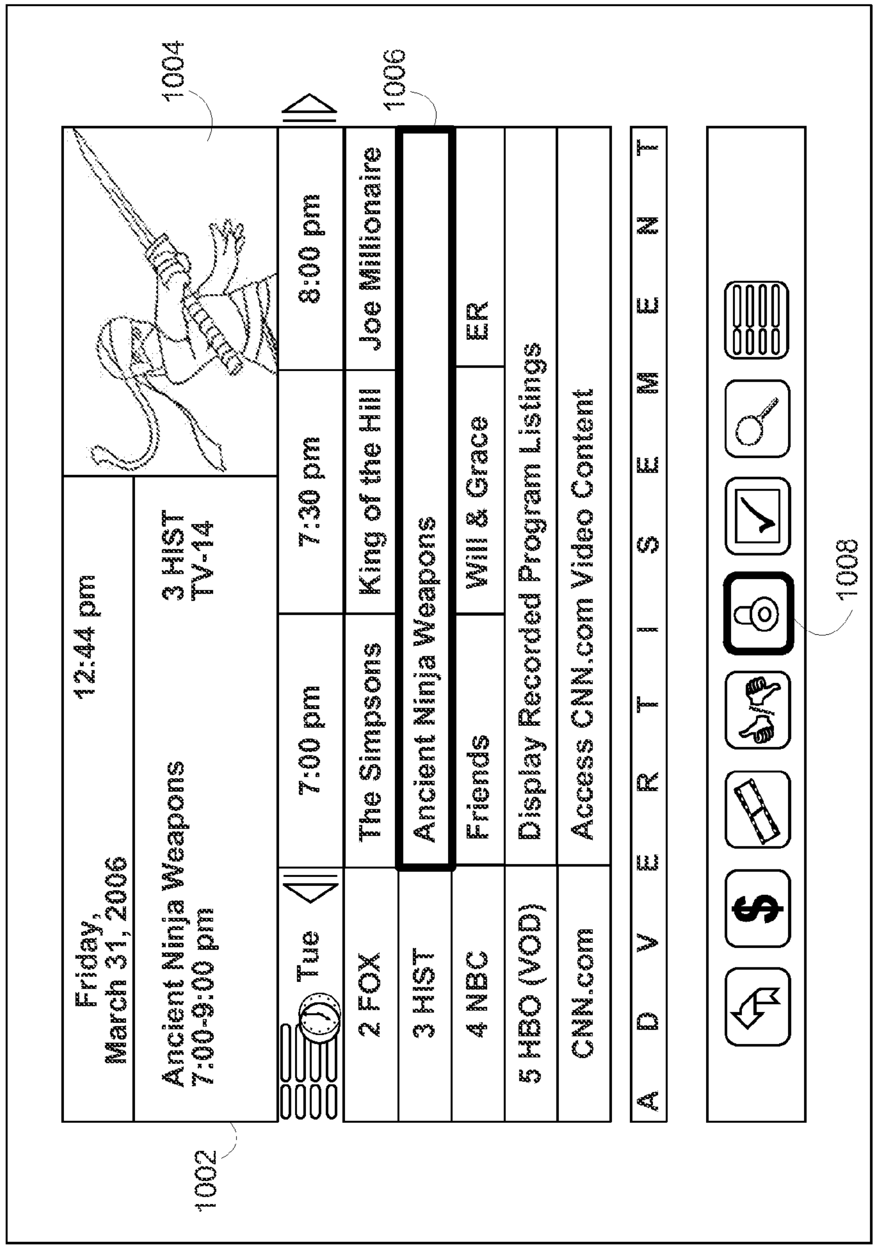
FIG. 10 shows an illustrative display screen capturing a user request to select and access a media asset in accordance with some embodiments of the disclosure.

FIG. 10 shows an illustrative display screen capturing a user request to select and access a media asset in accordance with some embodiments of the disclosure. Screen 1000 includes program listing 1006 of a media asset, a program information region 1002, and a video region 1004. A user may navigate highlight region 110 from program listing 108 of FIG. 1 to program listing 1006 of FIG. 10 by pressing an arrow key on a user input device (e.g., user input interface 510). In response to receiving the user input, control circuitry 504 may generate for display additional information about the media asset in program information region 1002. Thereafter, if the user wishes to access the media asset associated with program listing 1006, the user may press an OK/SELECT button or a similar button on the user input device to select the media asset. Parental control options, including crowd-sourced access control options, may be accessed by navigating to and selecting option icon 1008 in options region as described in relation to FIG. 1 above.

In accordance with some embodiments of the disclosure, user interfaces (e.g., display screen 100, 1000, and other display screens described herein) may be generated for display by control circuitry of a second screen device. The user interface generated may display ancillary content related to the media asset currently being accessed on a first user equipment device. In other embodiments, the user interface on second screen devices may first be generated by control circuitry of a primary user equipment device that is located remotely or in close proximity to the second screen device. The user interface may then be communicated to the second screen device via communications path or communications network as described above in relation to FIG. 4.

Figure 11:
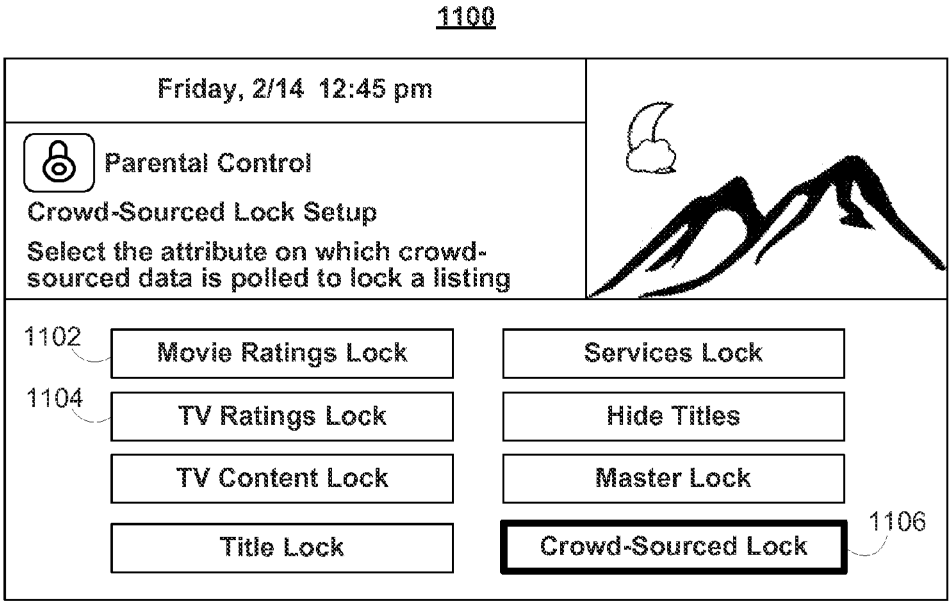
FIG. 11 shows an illustrative display screen for setting up access control options in accordance with some embodiments of the disclosure.
Figure 12:
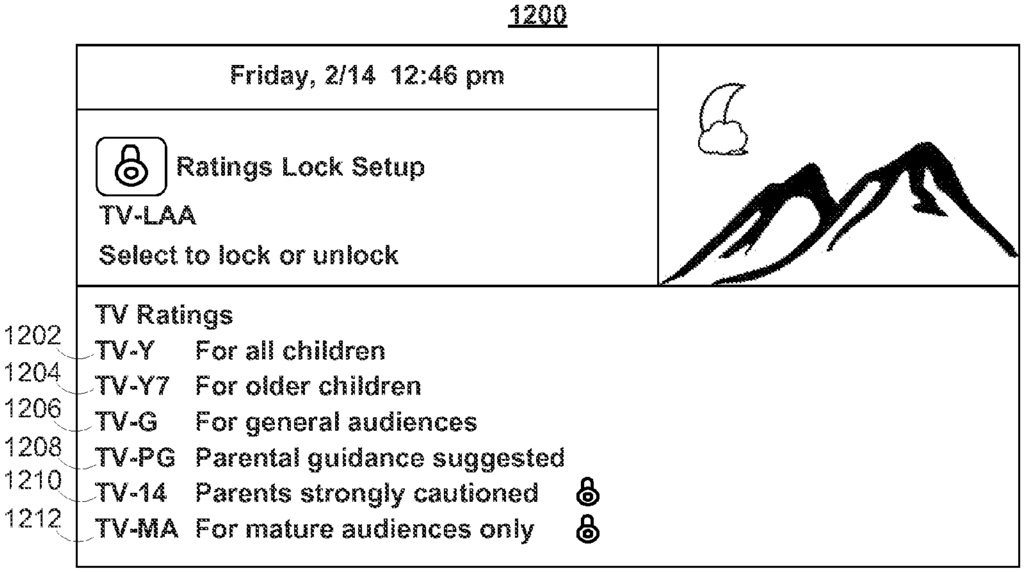
FIG. 12 shows an illustrative display screen for setting up conventional ratings-based access control options in accordance with some embodiments of the disclosure.

Upon receiving a user selection for parental control option icon 1008, control circuitry 504 may generate for display an illustrative display screen 1100 of FIG. 11. Display screen 1100 may show a menu of options for setting up access control settings based on different criteria. For example, the user may block access to movies by movie ratings ("Movie Ratings Lock" 1102) or block access to TV shows by TV ratings ("TV Ratings Lock" 1104). A user may access each access control option on screen 1100 by navigating to the corresponding identifier for the access control option. As an example, the user may navigate to TV Ratings Lock 1104 on screen 1100 using a user input device (e.g., remote control). After receiving a user selection of TV Ratings Lock option 1104, control circuitry 504 may generate for display a submenu such as an illustrative display screen 1200 of FIG. 12.

Options 1202 through 1212 are illustrative TV rating options that may be selected by user on the submenu shown on display screen 1200. If the user navigates to and selects option TV-14 1210, the option may be labeled by a lock icon, indicating that TV shows rated TV-14 will be locked out of reach for a user. In addition, any options rated higher than TV-14, such as option TV-MA 1212, will be locked as well because a user who is prevented from accessing TV shows rated TV-14 should also be prevented from accessing TV shows rated above TV-14 (in this example, TV-MA). As a result, TV shows rated TV-14 or TV-MA will not be available to the user, unless an appropriate access code is entered (as will be described in relation to FIG. 14.)

As another example, a user may navigate to crowd-sourced lock 1106 on display screen 1100 using a user input device (e.g., remote control). After receiving a user selection of the crowd-sourced lock option 1106, control circuitry 504 may generate for display a submenu such as illustrative display screen 1300 of FIG. 13.

Lock information region 1302 displays a brief description of the crowd-sourced lock. A user may navigate through the submenu to select an appropriate value for crowd-sourced attribute 1304, attribute value 1306, and threshold 1308. Crowd-sourced attribute 1304 may be selected from dropdown menu 1310, such as age, age group, profession, citizenship, marital status, security level, and priority level. The selected crowd-sourced attribute may correspond to the USER ATTRIBUTE field of request data structure 800 in FIG. 8. Crowd-sourced attribute may indicate a representative user attribute that the user shares with a group of other users, such that crowd-based access control should be carried out based on the collective behavior of this particular group of users. For example, a 15-year-old teenager may share similar access permissions as other teenagers of the same age when it comes to accessing TV shows or movies. A guest user of a software application may be given similar levels of security clearance as other guest users who have accessed the same or a similar software application. A conservative group may collectively deem certain contents are unacceptable for members of their peer group. Attribute Value 1306 may be a value provided for the selected crowd-sourced attribute. For instance, "15 and under" may be an appropriate attribute value for the attribute "age group", "guest" for the attribute "security level", and "non-violence" for the attribute "content". Dropdown menu 1312 that corresponds to attribute value 1306 may be dynamically populated based on user selection of dropdown menu 1310, so that "15 and under" will not appear in dropdown menu 1312 if user has selected "security level" in dropdown menu 1310. Threshold 1308 may be an access control threshold, based on which a permission decision may be made by the media access control functions. In case that the suggested threshold options do not meet the need of a user, the user may customize this option. Threshold options may, in addition, be associated with a threshold level identifier, so that "more than 50% have accessed or recommended" may be identified as threshold level 2, for instance. This availability is also illustrated in field 812 of FIG. 8.

In relation to the use cases and examples used in the foregoing figures, an illustrative embodiment of crowd-sourced access control options, such as Crowd-sourced Lock 1106, is described below. A 15-year-old teenage user may request access to a history channel documentary titled ANCIENT NINJA WEAPONS through an interactive media guide. The user has an access control profile set up at the interactive media guide, which contains user attributes such as age, age group, security level etc. as well as a threshold value based on which an access permission decision may be made. In particular, the threshold may dictate that the user should be denied access to the documentary if more than 50% of other users from the same age group ("12-15") have also been denied access or been recommended against accessing it.

Upon receiving this request, an interactive media guide may retrieve, from its database, other users from the same age group who have requested to access similar programs, such as the documentary DEATH WEAPONS OF THE EAST from the History Channel. The similar programs are identified based on shared media attributes, such as title, genre, media rating, keyword, rating etc. For instance, the interactive media guide may first identify a number of attributes for the requested documentary. One of them may be a genre, which indicates that the requested documentary belongs to a "military history" genre. Subsequently, the interactive media guide compares the genre of DEATH WEAPONS OF THE EAST, which several other users have requested to access, with that of ANCIENT NINJA WEAPONS. As a result, the interactive media guide finds the two documentaries to be of the same genre, and are therefore considered to be similar to each other.

The interactive media guide may then generate a statistical representation of the percentage of the retrieved users who have been denied access to their requested documentaries (such as DEATH WEAPONS OF THE EAST). Access to these documentaries may be denied because they are generally considered to be inappropriate for kids under 16, or because parents have previously set access control locks on programs having certain media attributes. As such, the interactive media guide may determine that the threshold of 50% as defined in the requesting user's profile is met, and therefore the user's request is denied.

Accordingly, the user's request to access a media asset may be denied if similar users' requests to access similar media assets are also denied.

As another example, access control can be dynamically adjusted based on the monitored or crowd-sourced viewing habits of a group. The content tolerance threshold of a group may be ever-evolving with time, which can be tracked and applied to users belonging to the same group. Leaders of a conservative group, for instance, may determine that music depicting teen love can now be considered acceptable to members of the group, whereas such music was previously considered inappropriate and was banned. As a result of this change of sentiment or attitude, a member of the group may henceforth be allowed to tune to music channels playing such music.

The dynamically adjusted access control function may also be applied to a recommendation scenario. In some embodiments, the profiles of a pool of like-minded people, such as thought leaders, trusted friends, or specific individuals, may be monitored and evolving their content access habit may be tracked over time. This may be used to recommend contents to users associated with the same group. For example, the fans of a rock star may choose to follow the fashion taste of the rock star. The fans may then configure their set top boxes to accept only advertisements related to the current fashion taste of the rock star.

Crowd-sourced access control options may be set up to operate concurrently with existing access control options, such as TV Ratings Lock 1104.

Figure 13:
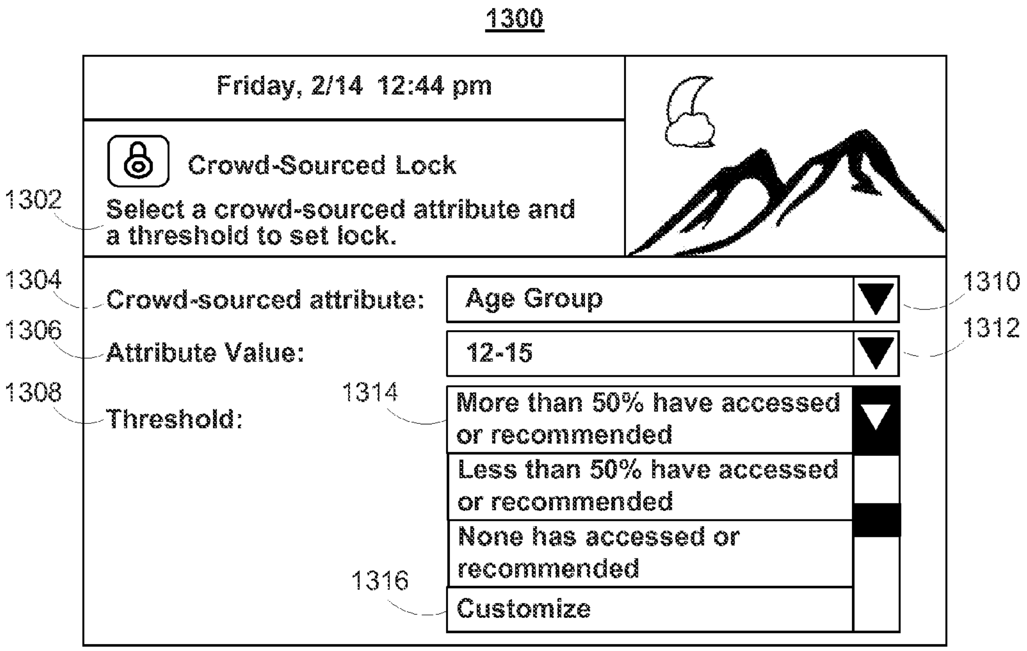
FIG. 13 shows an illustrative display screen for setting up crowd-sourced access control options in accordance with some embodiments of the disclosure.
Figure 14:
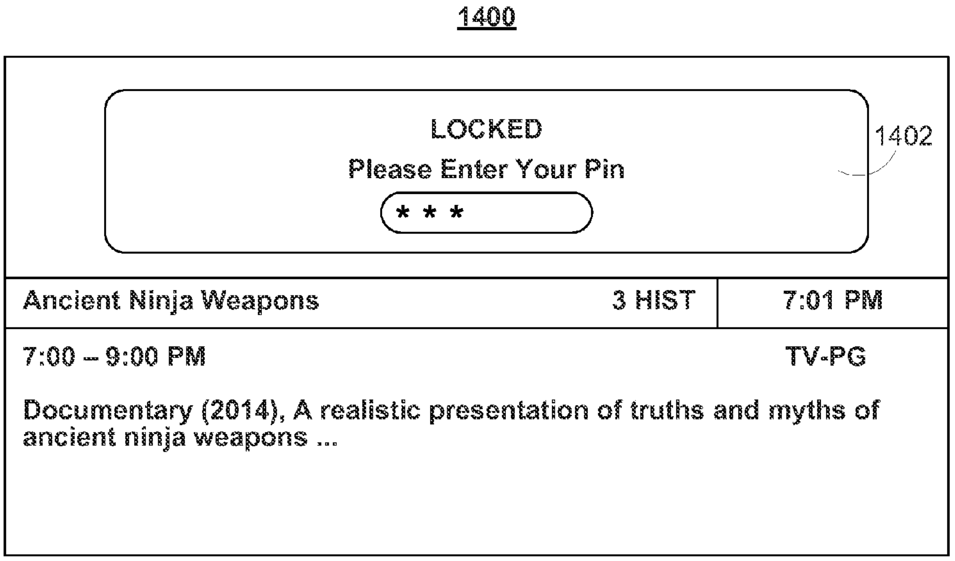
FIG. 14 shows an illustrative display screen of a media asset being blocked by an access code in accordance with some embodiments of the disclosure.
Figure 15:
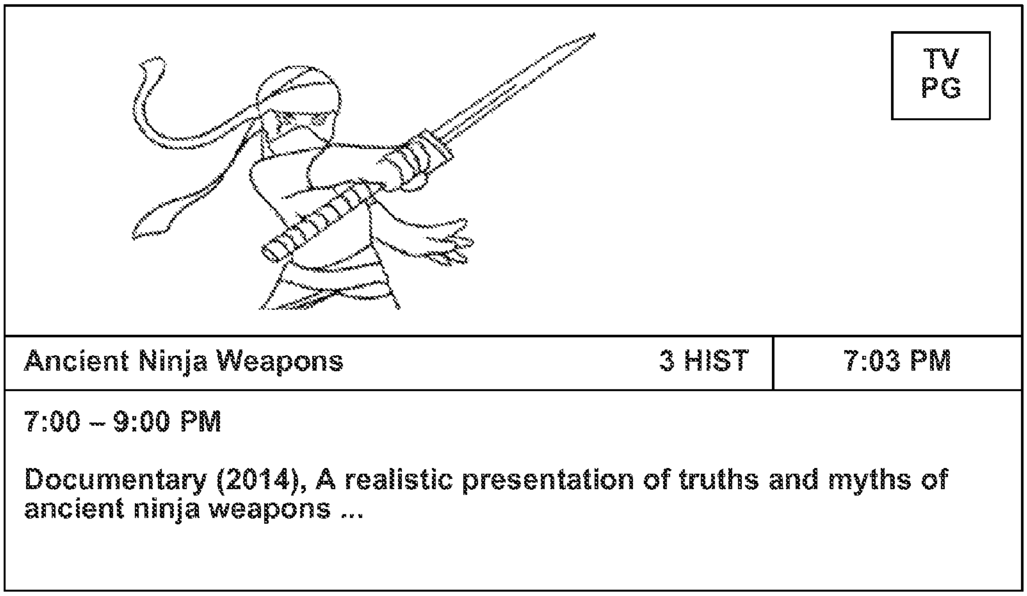
FIG. 15 shows an illustrative display screen of a media asset being displayed in accordance with some embodiments of the disclosure.

In some embodiments, the different access control options may be set up to operate additively. In such a setting, crowd-sourced access control options may block access to a media asset despite permission from another access control option (e.g., TV Ratings Lock 1104.) For instance, a user requested access to a media asset titled ANCIENT NINJA WEAPONS, which is rated TV-PG. As shown in FIG. 14, TV shows rated TV-PG will not be blocked by the TV Ratings Lock as presently configured. However, the user also has a user profile associated with the Crowd-sourced Lock as illustrated in FIG. 13, which requires that the Crowd-sourced lock only be bypassed if more than 50% of other users belonging to the age group "15 and under" has also gained access to the media asset. User equipment device then queries a media access control server 600 with the above information embedded in a request data structure 800. After performing a series of operations, the media access control server 600 replies with data structure 850, denying this access.

In other embodiments, the locks may operate in such a way that access to media assets are only blocked if all of the locks are in effect. In still other embodiments, the crowd-sourced lock may be the only lock configured on a user equipment device.

If a user is denied access to a media asset, the user will be prompted to enter an access code (e.g., a PIN), as shown in illustrative display screen 1400 of FIG. 14, in order to access the media asset. When the correct access code is entered, the media asset will be generated for display as shown in illustrative display screen 1500 of FIG. 15. In the event that multiple attempts have failed to unlock the media asset with the correct access code, a user may be banned from entering the access code for a predetermined amount of time.

FIG. 16 is a flow diagram of an illustrative process for implementing crowd-sourced media access control on a media access control system (e.g., system 300 or 400) in accordance with some embodiments of the disclosure.

At step 1610, the user may initiate a request for a media asset from any user equipment device (e.g., user television equipment 406, user computer equipment 407, wireless user communications device 408). As shown on illustrative display screen 1000, the user may request access to a media asset by navigating to an identifier for the media asset (e.g., program listing 1006 for the documentary ANCIENT NINJA WEAPONS, airing at 7:00 pm on 3, HIST.) The request may be captured at user input interface 510 as, for example, a button press, a tap on a touchscreen, a voice commands, etc. The user equipment device may be a primary device that implements a media guidance application. Alternatively, the user equipment device may be a second screen device as described above in connection with FIG. 4. By way of example, and not by way of limitation, the user request may contain instructions to tune to a program channel, initiate a streaming request, or select an identifier for a media asset.

At step 1620, upon receiving the request, control circuitry (e.g., control circuitry 504) on the user equipment device may determine if the user has an existing profile for a crowd-sourced media access control function (e.g., Crowd-Sourced Lock 1106.) A user profile may be substantially similar to the user profiles described in relation to FIG. 1, and may contain access control information specific to the user (e.g., media consumption data as described in connection with FIG. 7) and access control settings (e.g., illustrative display screen 1300 and fields 804 and 812 of data structure 800). If a user profile does not exist for the media access control function, the control circuitry may generate for display the requested media asset directly (step 1680), as no crowd-sourced media access control function has been set up. However, if a user profile does exist, the media access control function may proceed to verify whether the crowd-sourced media access control function (e.g., Crowd-Sourced Lock 1106) applies to the user's request for the media asset (beginning at step 1630).

At step 1630, control circuitry on the user equipment device may request, from a remote server (e.g., media access control server 600), media access control data related to the media asset. The request for media access control data may contain attributes related to the user (e.g., threshold level 812) and attributes of the media asset (e.g., title 808), as illustrated in request data structure 800. In particular, attributes related to the user may be automatically generated from the user profile (e.g., user profile information as described in relation to FIG. 1); or they may have been previously entered in an access control configuration interface such as that shown on display screen 1300.

Once the remote server receives the request for media access control data on an I/O path (e.g., I/O path 622), processing circuitry (e.g., processing circuitry 606) interrogate a database (e.g., database 608) based on information embedded in request data structure 800 at step 1640. As described above in relation to FIG. 6, data stored in the database (e.g., data structure 900) may be indexed based on attributes of media assets and attributes of users. Relevant data are retrieved from the database, by processing circuitry (e.g., processing circuitry 606) based on a matching of (a) the attributes of the stored media access control data, and (2) corresponding attributes contained in the request. For example, a user request (e.g., data structure 800) demands media access control data that are relevant for users belonging to the age group "12-15" and media assets titled ANCIENT NINJA WEAPONS. The request may be received on I/O path 622 and interpreted by processing circuitry 606 of media access control server 600. In response, processing circuitry 606 may query database 608 for media access control data (e.g., data structure 900) that contains the media attribute "title=ancient ninja weapons" and the user attribute "age group=12-15". Additional user and media asset attributes embedded in the request, such as genre and gender, may also be used for the query in order to avoid query results that are irrelevant. Once the query results are ready, server 600 may prepare for a response message to the user equipment's request for media access control data.

At this stage, there exists a number of different approaches, or network configurations, by which the user equipment device and the server may communicate with each other.

In some embodiments according to the first approach, control circuitry of the server (e.g., control circuitry 604) further processes the query results (e.g., data structure 900) by comparing them against the received user attributes (e.g., threshold level 812), and determines if access permission should be granted based on the received request and query results. The media access control function on the server may perform suitable operations on the received media access control data in order to determine if access to the requested media asset should be granted to the user. One suitable operation may be a statistical analysis, thereby generating a statistical value indicating the number of users who have been allowed to access or recommended access to similar media assets. The processing circuitry of the server (e.g., processing circuitry 606) may perform statistical analysis on the query results retrieved from database 608, in order to determine if the received data meets a threshold as defined by the user's crowd-sourced access control options (e.g., threshold 1308). For example, if the threshold is defined as "More than 50% have accessed or recommended" (e.g., threshold value 1314), the user should then be allowed access to the requested media asset only if more than 50% of other users (having the same or similar attributes as the user) have been granted access or have recommended granting access to the same or a similar media asset. In this case, the processing circuitry may compute the number of data entries that correspond to allowed accesses in the received media access control data. The illustrative data entry (e.g., data structure 900) will not be counted in this case, because the STATUS field 904 of illustrative data entry indicates that an access attempt had been denied ("negative"). At the end of the statistical analysis, if more than 50% of the data entries in the received media access control data indicate successful access to the media asset (e.g., "positive" in STATUS field in illustrative data structure 900), access permission should be granted to the user. Upon making this permission decision, processing circuitry may prepare for a response to the user equipment device (step 1640). In this case, a permission is not granted (e.g., data structure 840) because the threshold level configured by the user is not met based on the query results. As a result, user equipment device 500 may receive on the I/O path 522 the data structure indicating that permission is denied for the corresponding user request, data structure 800 (step 1650).

In some other embodiments according to the second approach, control circuitry of the server may simply package the retrieved query results (e.g., data structures 920 and 940) into a response (e.g., data structure 860), and transmits this response to the user equipment device on I/O path 622 without further processing the retrieved query results (step 1640). Therefore, determination of access permission will have to be completed at the user equipment device (step 1650), by processing circuitry 506. This determination process may be substantially similar to the suitable operations (e.g., a statistical analysis) as described above in relation to the server, except that the operations are instead performed by control circuitry of the user equipment.

The above steps 1630-1650 may collectively be referred to as step 1660, which describes the process of verifying if crowd-sourced media access functions, such as Crowd-Sourced Lock, should be applied to a particular media asset that a user has requested.

In both the first and the second approaches, once the user equipment device receives the response, its processing circuitry may determine if access permission has been granted by the media access control function. If access has been granted, control circuitry of the user equipment (e.g., control circuitry 504) may generate for display the requested media asset for the user at step 1680, such as the illustrative display screen 1500. If, however, access permission has been denied, control circuitry of the user equipment may generate for display a prompt (e.g., prompt 1402 of display screen 1400) for the user to enter an access code in order to access the media asset, at step 1670.

At step 1670, processing circuitry of the user equipment (e.g., processing circuitry 506) determines if a correct access code has been entered by the user. If a correct access code has been entered, the control circuitry may generate for display the requested media asset at step 1680 (e.g., display screen 1500). However, if the access code entered is incorrect, the control circuitry may continue generating for display the prompt until a correct access code is entered. In some embodiments, a warning message may appear to notify the user that the access code entered is incorrect (e.g., in an overlay). In the event that multiple attempts have failed to unlock the media asset with the correct access code, a user may be banned from entering the access code for a predetermined amount of time.

FIG. 17 is a flow diagram of an illustrative process for implementing crowd-sourced media access control in a media guidance system (e.g., system 400) in accordance with some embodiments of the disclosure. Crowd-sourced media access control functions operate simultaneously with conventional access control options (e.g., ratings-based access control) to carry out the steps outlined in process 1700.

At step 1710, the user may initiate a request for a media asset from any user equipment device (e.g., user television equipment 406, user computer equipment 407, wireless user communications device 408). As shown on illustrative display screen 1000, the user may request access to a media asset by navigating to an identifier for the media asset (e.g., program listing 1006 for the documentary ANCIENT NINJA WEAPONS, airing at 7:00 pm on 3, HIST.) The request may be captured at user input interface 510 as, for example, a button press, a tap on a touchscreen, a voice commands, etc. The user equipment device may be a primary device that implements a media guidance application. Alternatively, the user equipment device may be a second screen device as described above in connection with FIG. 4. The user request may contain instructions to tune to a program channel, initiate a streaming request, or select an identifier for a media asset.

At step 1720, upon receiving the request, processing circuitry (e.g., processing circuitry 506) on the user equipment device determines if the requested media asset has been blocked by a media access control function implemented on the user equipment device. At this step, the media access control function carried out by processing circuitry (e.g., processing circuitry 506) only consults conventional ratings-based access control options (e.g., TV Ratings Lock 1104). If the media asset is indeed blocked by conventional access control options, an access code may be required in the context of additive media access control options. In this case, process 1700 enters step 1730, where an access code will be required. For example, a user requesting a TV show rated at TV-MA will be blocked from access, given the access control options as configured on display screen 1200. However, if the media asset requested is not blocked by conventional ratings-based access control options, process 1700 enters step 1740 to determine if crowd-sourced access control options may apply.

At step 1740, upon receiving the request, the processing circuitry on the user equipment device determines if the user has an existing profile for the media access control function (e.g., Crowd-Sourced Lock 1106.) A user profile may be substantially similar to the user profiles described in relation to FIG. 1, and may contain access control information specific to the user (e.g., media consumption data as described in connection with FIG. 7) and access control settings (e.g., illustrative display screen 1300). If a user profile does not exist for the media access control function, the control circuitry may generate for display the requested media asset (step 1760), as no crowd-sourced media access control function has been set up. However, if a user profile does exist, the media access control function may proceed to verify whether the crowd-sourced media access control function (e.g., Crowd-Sourced Lock 1106) applies to the user's request for the media asset.

At step 1750, the processing circuitry of the user equipment device may determine whether crowd-sourced media access control function is applicable to the user's request. The detailed process of step 1750 may be substantially similar to step 1660 as described above in relation to FIG. 16, and is therefore shown as a single step here to avoid overcomplicating the drawings. As an example, in relation to the illustrative access control options configured on display screen 1300, processing circuitry 506 may determine the user's age to be within 12-15, and therefore requests crowd-sourced media access control data based on user attribute "age group" for the requested media ("ancient ninja weapons"), such as that shown in data structure 800. In response, media access control server 600 may query database 608 for media access control data matching the "age group" and "title" of the request, in order to determine if access should be allowed for this request.

If access is allowed by crowd-sourced access lock in step 1750, processing circuitry of the user equipment (e.g., processing circuitry 506) may generate for display the requested media asset for the user at step 1760. If, however, access permission has been denied, control circuitry of the user equipment may generate for display a prompt (e.g., prompt 1402 of display screen 1400) for the user to enter an access code in order to access the media asset, at step 1730.

At step 1730, the processing circuitry of the user equipment determines if a correct access code has been entered by the user. If a correct access code has been entered, the control circuitry may generate for display the requested media asset at step 1760. However, if the access code entered is incorrect, the control circuitry may continue generating for display the prompt until a correct access code is entered. In some embodiments, a warning message may appear to notify the user that the access code entered is incorrect (e.g., in an overlay). In the event that multiple attempts have failed to unlock the media asset with the correct access code, a user may be banned from entering the access code for a predetermined amount of time.

FIG. 18 is a flow diagram of an illustrative process for determining if retrieved media access control information meets a threshold in accordance with some embodiments of the disclosure. As described above in relation to FIGS. 16-17, the retrieved query results (e.g., media access control data such as data structures in FIG. 9) may be compared against a threshold level as defined by a user's crowd-sourced media access control options (e.g., field 1308 of display screen 1300). This comparison may be completed by processing circuitry on a user equipment (e.g., processing circuitry 506) in some embodiments, or by processing circuitry on a server (e.g., processing circuitry 606 of media access control server 600) in some other embodiments. The process outlined below describes steps involved in making such a comparison, and ultimately arriving at a permission decision as described in relation to FIG. 8 above.

At step 1810, processing circuitry (e.g., processing circuitry 506 on the user device, or processing circuitry 606 on the server) receive query results from a database query, in accordance with, for example, the process described in relation to step 1640 of FIG. 16. The query results may be received on an I/O path (e.g., I/O path 522) of the user device, or an internal communications bus (e.g., bus 607) of the server. As described in connection with FIGS. 9 and 16, the query results received may be in the form of "raw" media access control data, such as data structures 900, 920, and 940 of FIG. 9.

At step 1820, the processing circuitry of step 1810 may translate a threshold level into an access control threshold. In some embodiments, the threshold level is received by the processing circuitry of the server on I/O path 622, and may be substantially similar to field 812 of request data structure 800. Field 812 contains an identifier (i.e., "2") for an access control threshold that is commonly understood by media access control function of both the user device and the server. The access control threshold (such as threshold value 1314) may indicate a statistical importance based on access permission decisions of other users. On the user device, for example, a user's selection of a particular value for threshold (e.g., threshold value 1314 selected for threshold field 1308 on display screen 1300) may be registered, by the processing circuitry (e.g., processing circuitry 506) of the user device, as a threshold level (e.g., "2"). Thereafter, processing circuitry (e.g., processing circuitry 606) of the server may receive this threshold level (e.g., "2") and translate it into the threshold value as originally selected by the user (i.e., threshold value 1314 indicating "more than 50% have accessed or recommended"). The translation may be achieved by employing a lookup table, a dictionary, a hash table, or any other suitable means of data translation mechanism as understood by one of ordinary skill in the art. In some other embodiments, the threshold level may be stored in a local memory or storage (e.g., storage 508) of the user device. Upon receiving the query results from the server on I/O path 522, the processing circuitry of the user device (e.g., processing circuitry 506) may translate the stored threshold value associated with the threshold level into the threshold value that was originally selected by the user (e.g., threshold value 1314), by employing a lookup table, a dictionary, a hash table, or any other suitable means of data translation mechanism as understood by one of ordinary skill in the art.

Threshold values (such as threshold value 1314) are shown to include both (1) users who have accessed or been granted permission to access a media asset and (2) users who have recommended granting access to a media asset. However, it should be understood that the illustrative threshold values (such as threshold value 1314) are shown by way of example, and not by way of limitation. Consequently, the threshold values may be defined in other formats, such as "less than 40% of others have actually accessed", or "none have recommended". Furthermore, the threshold value may be constructed to include only crowd-sourced data from a particular source, such as those recommendations from editorial ratings professionals. For example, a user may customize the threshold value (e.g., threshold value 1316) to include only crowd-sourced data from a particular source (e.g., field 714 editorial_ratings_source). As a result, only data containing information about the source will be queried by the processing circuitry (e.g., processing circuitry 606) of the server.

At steps 1830 and 1840, the processing circuitry of the server compiles query results (e.g., media access control data such as data structures in FIG. 9) based on a STATUS field. As described in connection with FIG. 9, the STATUS field may indicate if a particular query result corresponds to an access, permission to access, or recommendation to access a media asset (e.g., STATUS field 924 and 944). Alternatively, the STATUS field may indicate if a particular query result corresponds to a failed access, denial for access, or recommendation not to access a media asset (e.g., STATUS field 904). The compiled query results will be compared against the above-described access control threshold by processing circuitry (e.g., processing circuitry 506 of the user device, or processing circuitry 606 of the server) at step 1850. If the compiled query results meet the requirement of the access control threshold (e.g., threshold value 1314), a permission decision may be made to grant access to the requested media asset for the requesting user (e.g., display screen 1600); otherwise, a permission decision may be made to deny the access (e.g., field 844) and an access code will be required in accordance with step 1670 of FIG. 16 (e.g., display screen 1400).

FIG. 19 is a flow diagram of an illustrative process for processing media consumption data from multiple sources as part of a data mining function in accordance with some embodiments of the disclosure. Process 1900 shows a number of functions carried out by a data mining server (e.g., crowd-sourced data mining server 602), such as crawling media consumption data, performing natural language processing on received crawler data, updating database (e.g., database 608) with the processed text, etc. Steps shown in process 1900 are meant to illustrate how data mining function may be carried out in some embodiments, and should not be construed as the only means to that end. Additionally, steps shown in process 1900 may be executed in a loop, and the description below which begins at step 1902 by no means indicates that step 1902 is the beginning of the illustrative process.

At step 1902, a crawler such as an internet crawler aggregates media consumption data from a number of sources (e.g., social media server 402, editorial server 404, and user equipment devices). The crawler may be processing circuitry, such as processing circuitry 606 of the media access control server 600. As described in relation to FIG. 4, media consumption data may contain user data (such as clickstream data corresponding to a usage history), and media data. The user data and media data may be in the form of data structures 700, 710, 730, and 750 of FIG. 7, each of which includes attributes of a user and a media asset.

Steps 1904 to 1914 may be collectively referred to as step 1920. Step 1920 illustrates the typical steps involved in processing a human-readable raw text into machine readable keywords and tags, which can then be used to classify the raw text under a suitable category. A data mining server, such as the crowd-sourced data mining server 602, may be used to accomplish this procedure. As described in relation to the media access control server in FIG. 6, crowd-soured data mining server 602 may implement independent processing circuitry (e.g., processing circuitry 616), memory (e.g., storage 618), and internal communication paths such as buses (e.g., bus 617). At step 1904, raw text (e.g., datum in field 706 of data structure 700) may be received at input to the data mining server (e.g., at bus 620). The data mining server first conducts spell check and correction on the received text at step 1906, which may employ existing spell checking algorithms as understood by one of ordinary skill in the art. At step 1908, portions of the text are marked up as corresponding to particular parts of speech based on both their definition, as well as their context (e.g., relationship with adjacent and related words in a phrase, sentence, or paragraph). For example, subjects such as "history channel" and modifiers such as "inappropriate" are marked as such in order for further processing at later steps by the data mining processor. At step 1910, the previously marked parts of speech may each be associated with a concept so that the information contained within the original text message may be properly classified. At this stage, relationships may be drawn based on the logically deduced concept embedded within each part of speech. For example, "kids" and "under 16" may both be used to determine that the message is relevant to a human of the age group "under 16". Therefore, context information such as "under 16" may be labeled as belonging to the field "age group". An additional step 1912 may be necessary to determine the context of the concepts being extracted, if the raw text involves convoluted concepts such as modifiers to a noun. In the example above, "ancient ninja weapons" may be a noun-phrase that needs to be parsed at step 1912 before the received text can be classified as being related to "weapons" and "ninja". Finally, each extracted context information may be labeled at step 1914 as being associated with a particular attribute (e.g., "title" or "gender") that is ready to be compiled into a data structure (e.g., data structure 900).

Additional processing may be conducted by the data mining server on the identified context information using, for example, techniques in inferential logic. Using the example of transcribing media consumption data (e.g., data structure 700) into a corresponding media access control data (e.g., data structure 900), an inferential logic function may be carried out on the extracted context information "kids" and "under 16" to associate the received raw text with field 906 under age group "15 and under", as the two concepts are substantially similar.

At the end of step 1920, the data mining server may produce media access control data (e.g., data structure 900) to be entered into a database (e.g., database 608). In some embodiments, the media access control data may be transmitted via an internal bus (e.g., bus 620) to processing circuitry (e.g., processing circuitry 606) to be entered into the database.

Figure 20:
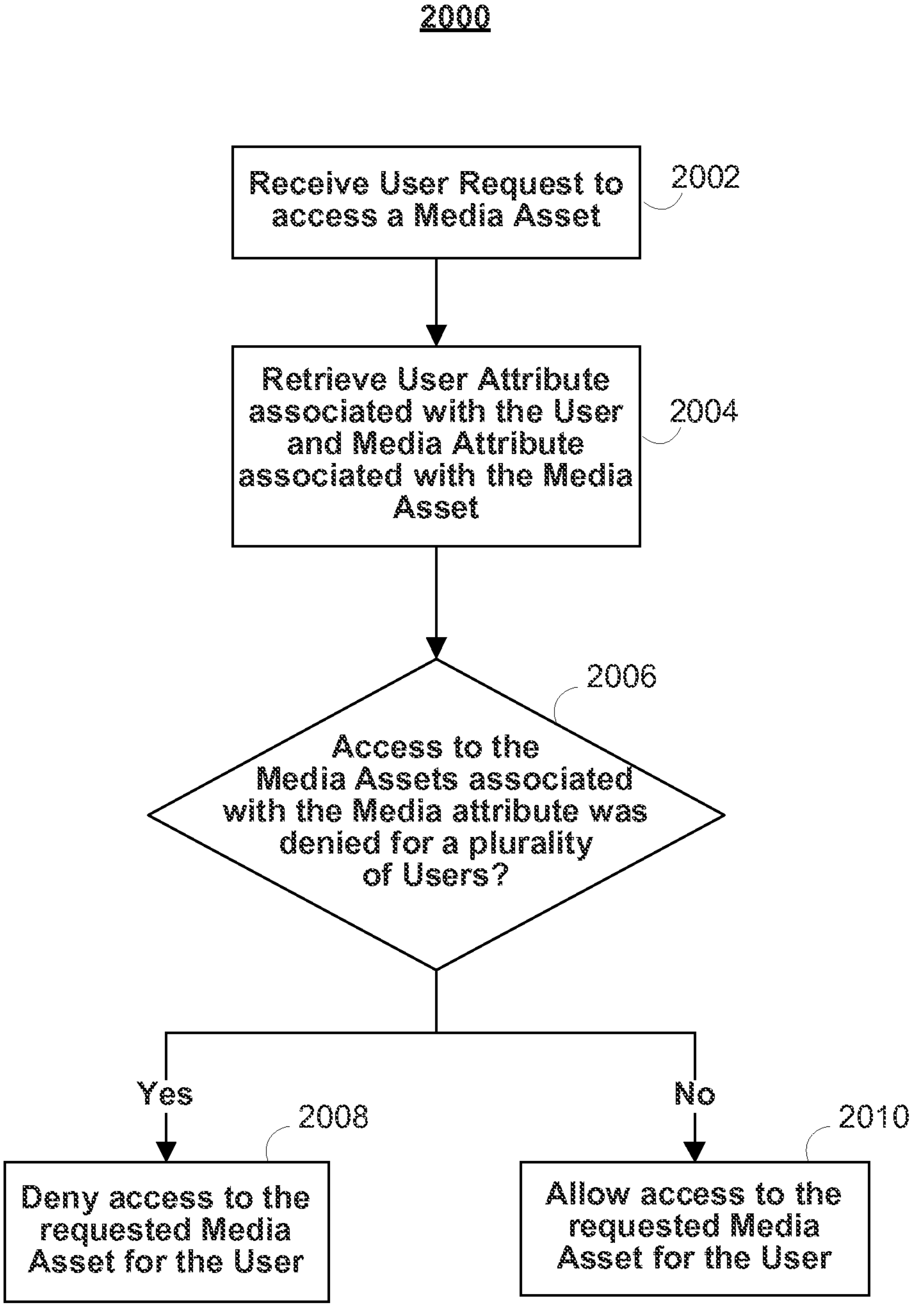
FIG. 20 is a flow diagram making a crowd-based media access control decision in accordance with some embodiments of the disclosure.

FIG. 20 is a flow diagram making a crowd-based media access control decision in accordance with some embodiments of the disclosure.

At step 2002, processing circuitry of a user equipment (e.g., processing circuitry 506) may receive a user request to access a media asset from a user input interface (e.g., user input interface 510). For example, the request may be from a user aged 12-15 to access a history program titled ANCIENT NINJA WEAPONS, as illustrated by request data structure 800.

At step 2004, the processing circuitry may retrieve a user attribute associated with the user and a media attribute associated with the media asset from memory (e.g., storage 506). For example, the age group (field 804) associated with the user in data structure 800 has a value of "12-15"; and the title associated with the media asset in data structure 800 is "ANCIENT NINJA WEAPONS".

At step 2006, the retrieved attributes may be used to determine whether access to the media assets associated with the media attribute was denied for a plurality of users. For example, the system may determine whether other users have been denied access to the program titled ANCIENT NINJA WEAPONS. In response to determining that access was denied, the process proceeds to step 2008, otherwise the process proceeds to step 2010.

At step 2008, the user's request to access the media asset is denied. For example, the other users falling in the age group of 12-15 have not accessed any program titled ANCIENT NINJA WEAPONS.

Otherwise, at step 2010, the user may be allowed to access the media asset.

Figure 21:
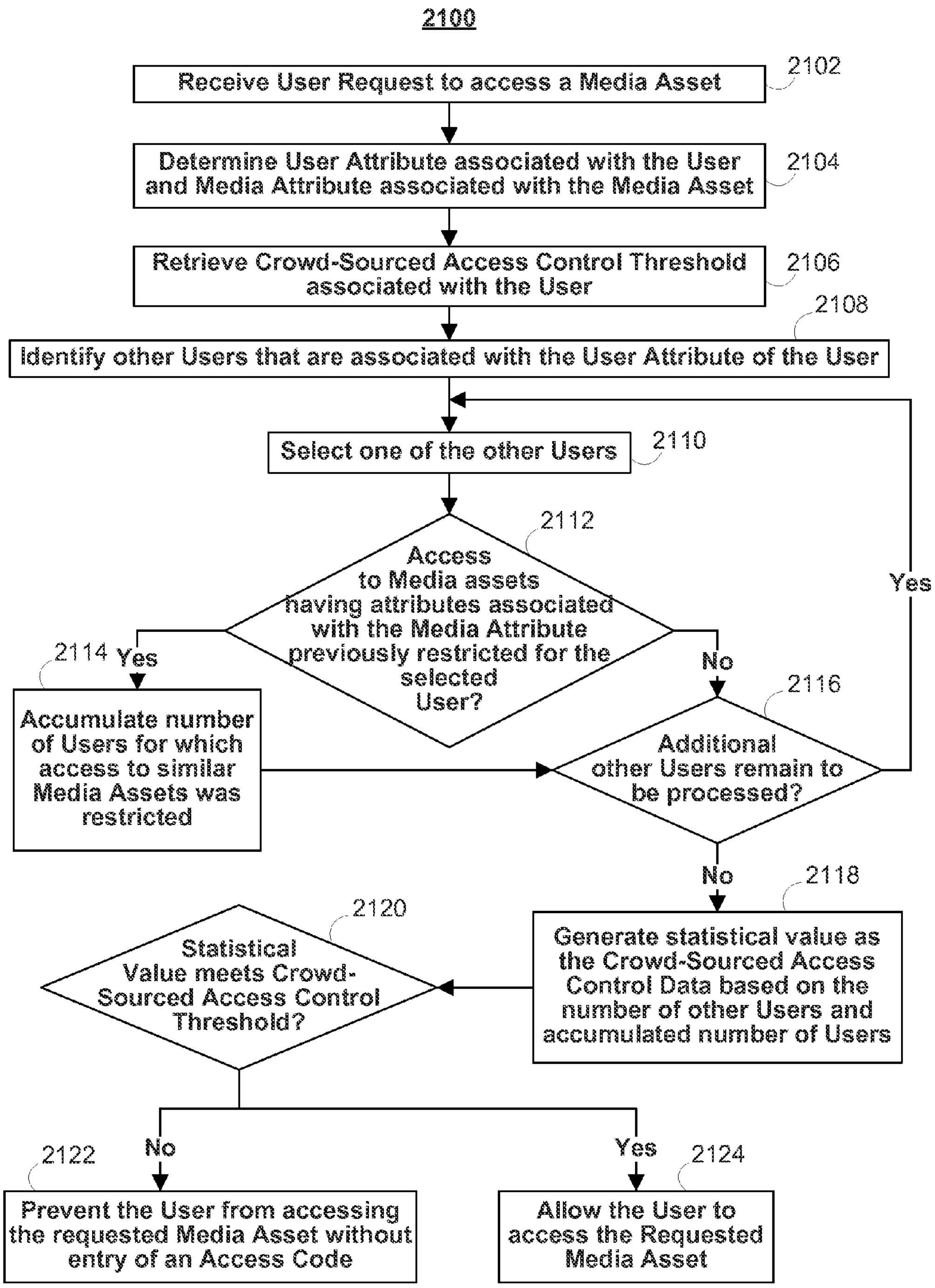
FIG. 21 is a flow diagram for controlling media access based on crowd-sourced access control data and user-attributes in accordance with some embodiments of the disclosure.

FIG. 21 is a flow diagram for controlling media access based on crowd-sourced access control data and user-attributes in accordance with some embodiments of the disclosure.

At step 2102, processing circuitry of a user equipment (e.g., processing circuitry 506) may receive a user request to access a media asset from a user input interface (e.g., user input interface 510). For example, the request may be from a user aged 12-15 to access a history program titled ANCIENT NINJA WEAPONS, as illustrated by request data structure 800.

At step 2104, the processing circuitry may determine a user attribute associated with the user and a media attribute associated with the media asset from memory (e.g., storage 506). For example, the age group (field 804) associated with the user in data structure 800 has a value of "12-15"; and the title associated with the media asset in data structure 800 is "ANCIENT NINJA WEAPONS". The determination of the user attribute may be based on at least a user profile associated with the user that is stored in memory (e.g., storage 508). In addition, the media attribute may be received on user equipment on a communications path (e.g., communications path 416) from a remote source (e.g., media content source 426 or media guidance data source 428).

At step 2106, the processing circuitry may retrieve a crowd-sourced access control threshold. For example, field 812, which corresponds to threshold 1314 "more than 50% have accessed or recommended", may be a crowd-sourced access control threshold retrieved by the processing circuitry.

At step 2108, the user attributes determined at step 2104 may be further used by a processing circuitry (e.g., processing circuitry 606) to identify a number of other users that are associated with the user attribute of the user (step 2108), and selects one of the users (step 2110) to begin aggregating statistics for computing whether access should be granted to the requesting user. As an example, step 2108 may identify other users from the age group "12-15", since the requesting user has an attribute as such, as shown in step 2104.

At step 2110, a user is selected from the users identified in step 2108.

At step 2112, the selected user's media asset access history may be obtained by processing circuitry (e.g., processing circuitry 606) in order to determine if access to media assets having similar attributes as the requested media asset has previously been restricted. For example, the system may determine whether other users have been denied access to the program titled ANCIENT NINJA WEAPONS. In response to determining that access was has previously been restricted, the process proceeds to step 2114, otherwise the process proceeds to step 2116.

At step 2114, the processing circuitry may increment a counter for the number of users for which access to similar media assets was restricted at step 2114. The counter may be kept in a memory (e.g., storage 508) in order to remain available to the processing circuitry throughout the iterative process. The processing circuitry then moves on to step 2116 to determine if a new user may be processed according to the procedure outlined in steps 2110 through 2114.

At step 2116, the processing circuitry may determine if additional users need to be processed. If so, the process proceeds to step 2110 to restart the process loop (steps 2110-2116), otherwise, the process proceeds to step 2118. The process loop repeats itself until processing circuitry in step 2116 determines that all users have been considered.

At step 2118, processing circuitry (e.g., processing circuitry 506) may generate a statistical value based on the number of other users and accumulated number of users as calculated in the steps illustrated in steps 2110-2116. This statistical value may be generated in a similar fashion as the statistical analysis described in connection with FIG. 16. For example, the statistical value may be that access to media assets that have similar attributes as ANCIENT NINJA WEAPONS may have been restricted for 60% of the other users, and allowed for the remaining 30% of the users.

At step 2120, if the statistical value meets the crowd-sourced access control threshold, the process proceeds to step 2122 where processing circuitry may allow the user to access the requested media asset (e.g., display screen 1500). Otherwise, the process enters step 2124.

At step 2124, the user may be prevented from accessing the requested media asset without entry of an access code (e.g., display screen 1400). In the example above, the statistical value of 30% access does not meet the threshold, which is 50%)

Figure 22:
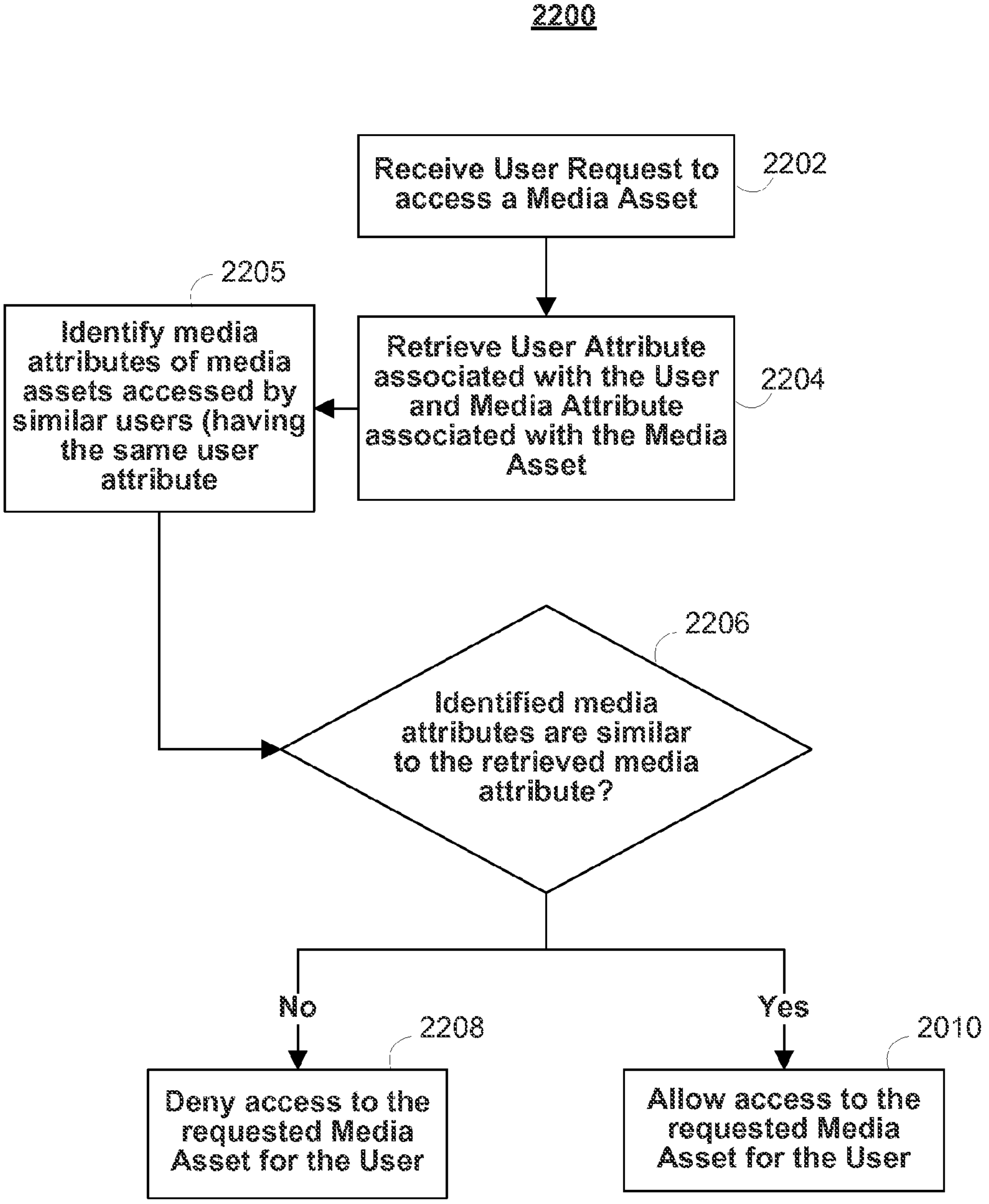
FIG. 22 is a flow diagram making a crowd-based media access control decision in accordance with some other embodiments of the disclosure.

FIG. 22 is a flow diagram making a crowd-based media access control decision in accordance with some embodiments of the disclosure.

At step 2202, processing circuitry of a user equipment (e.g., processing circuitry 506) may receive a user request to access a media asset from a user input interface (e.g., user input interface 510). For example, the request may be from a user aged 12-15 to access a history program titled ANCIENT NINJA WEAPONS, as illustrated by request data structure 800.

At step 2204, the processing circuitry may retrieve a user attribute associated with the user and a media attribute associated with the media asset from memory (e.g., storage 506). For example, the age group (field 804) associated with the user in data structure 800 has a value of "12-15"; and the title associated with the media asset in data structure 800 is "ANCIENT NINJA WEAPONS".

At step 2205, the retrieved user attribute may be used to identify a plurality of other users who are considered similar to the requesting user, and subsequently the media assets accessed by this plurality of users are examined to determine a plurality of media attributes (step 2205), which may generally describe the media assets that have been allowed to access by these similar users.

Thereafter, at step 2206, the retrieved attribute may be compared against the plurality of media attributes identified in step 2005 to determine whether the requested media asset is similar to what other users are accessing. For example, the system may determine whether any of the identified media attributes is the title "ANCIENT NINJA WEAPONS", or whether any of the titles of the identified media assets contain the word "weapon". In response to determining that the media assets are similar, the process proceeds to step 2210, otherwise the process proceeds to step 2212.

At step 2210, the user's request to the media asset will be allowed. Otherwise, at step 2212, the request will be denied.

Figure 23:
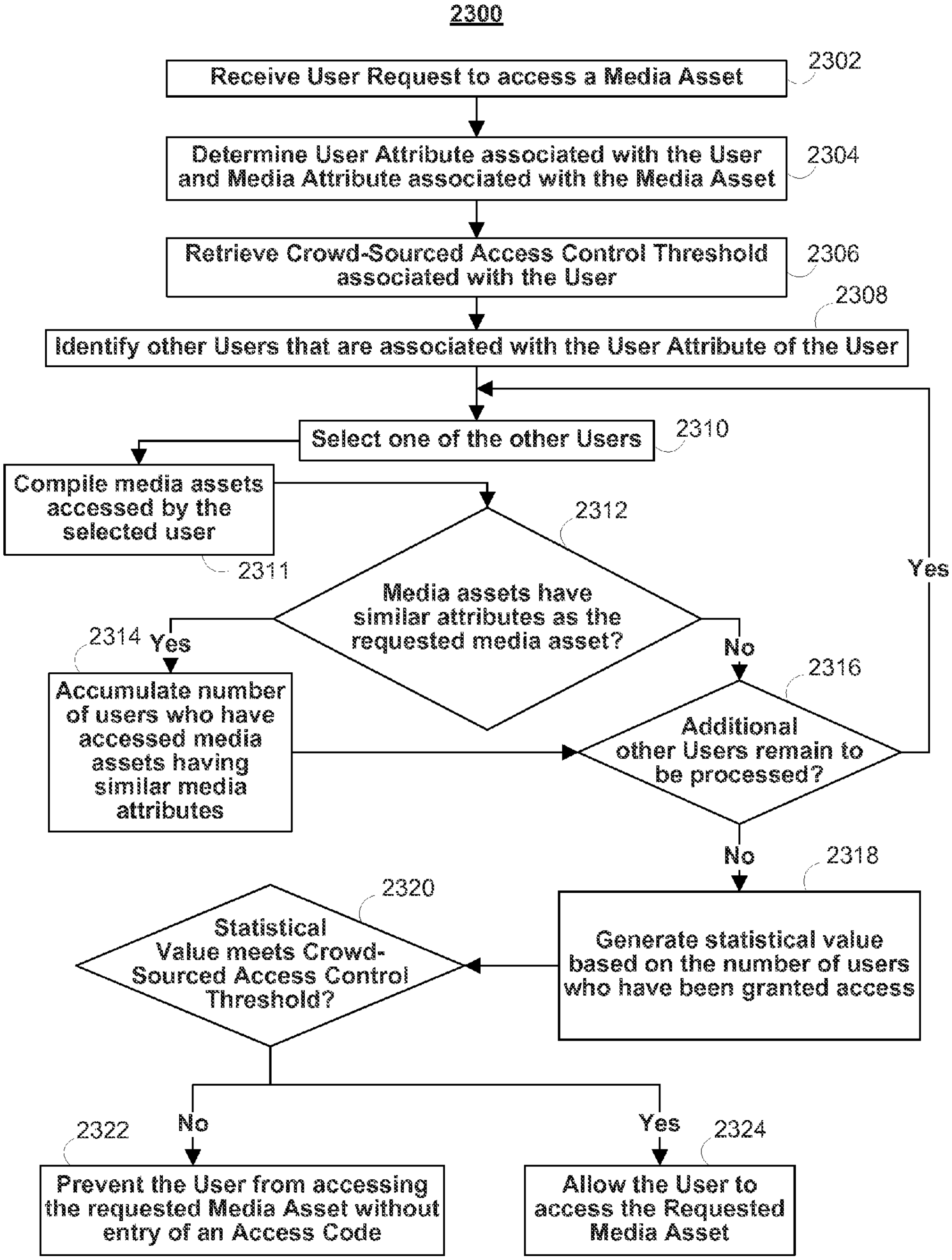
FIG. 23 is a flow diagram for controlling media access based on crowd-sourced access control data and user-attributes in accordance with some other embodiments of the disclosure.

FIG. 23 is a flow diagram for controlling media access based on crowd-sourced access control data and user-attributes in accordance with some embodiments of the disclosure.

At step 2302, processing circuitry of a user equipment (e.g., processing circuitry 506) may receive a user request to access a media asset from a user input interface (e.g., user input interface 510). For example, the request may be from a user aged 12-15 to access a history program titled ANCIENT NINJA WEAPONS, as illustrated by request data structure 800.

At step 2304, the processing circuitry may determine a user attribute associated with the user and a media attribute associated with the media asset (e.g., field 808). For example, the age group (field 804) associated with the user in data structure 800 has a value of "12-15"; and the title associated with the media asset in data structure 800 is "ANCIENT NINJA WEAPONS". The determination of the user attribute may be based on at least a user profile associated with the user that is stored in memory (e.g., storage 508). In addition, the media attribute may be received on user equipment on a communications path (e.g., communications path 416) from a remote source (e.g., media content source 426 or media guidance data source 428).

At step 2306, the processing circuitry may retrieve a crowd-sourced access control threshold. For example, field 812, which corresponds to threshold 1314 "more than 50% have accessed or recommended", may be a crowd-sourced access control threshold retrieved by the processing circuitry At step 2308, the user attribute determined at step 2304 may be further used by a processing circuitry (e.g., processing circuitry 606) to identify a number of other users that are associated with the user attribute of the user (step 2308), and selects one of the users (step 2310) to begin aggregating statistics for computing whether access should be granted to the requesting user. As an example, step 2308 may identify other users from the age group "12-15", since the requesting user has an attribute as such, as shown in step 2304.

At step 2310, a user is selected from the users identified in step 2308.

At step 2311, the selected user's list of media assets accessed by the selected user is identified and temporarily stored in memory (e.g., storage 508). In addition, the system may identify a number of media attributes that are associated with the list of media assets to be stored in memory as well. This identified number of media attributes may collectively describe the media accessing habits of the selected user in general. For example, the media attribute may indicate that the user typically accesses media assets of the genre "cartoon", and media assets described as being suitable for the age group "any".

Thereafter, at step 2312, the media attribute of the requested media asset is compared against the number of media attributes identified in step 2311 by processing circuitry (e.g., processing circuitry 606) in order to determine if they are similar. For example, the system may determine whether ANCIENT NINJA WEAPONS is of the genre "cartoon"). In response to determining that the media attributes are indeed similar, the process proceeds to step 2314, otherwise the process proceeds to step 2316.

At step 2314, the processing circuitry may increment a counter for the number of users who have accessed media assets having similar attributes. The counter may be kept in a memory (e.g., storage 508) in order to remain available to the processing circuitry throughout the iterative process. The processing circuitry then moves on to step 2316 to determine if a new user may be processed according to the procedure outlined in steps 2310 through 2314.

At step 2316, the processing circuitry may determine if additional users need to be processed. If so, the process proceeds to step 2310 to restart the process loop (steps 2310-2316), otherwise, the process proceeds to step 2318. The process loop repeats itself until processing circuitry in step 2316 determines that all users have been considered.

At step 2318, upon determining that all users have been processed according to step 2316, processing circuitry (e.g., processing circuitry 506) may generate a statistical value based on the number of other users who have also been allowed to access or recommended accessing similar media assets, as calculated in the steps illustrated in steps 2310-2316. This statistical value may be generated in a similar fashion as the statistical analysis described in connection with FIG. 16. For example, the statistical value may be that access to media assets that have similar attributes as ANCIENT NINJA WEAPONS may have been restricted for 60% of the other users, and allowed for the remaining 30% of the users.

At step 2320, if the statistical value meets the crowd-sourced access control threshold, the process proceeds to step 2322 where processing circuitry may allow the user to access the requested media asset (e.g., display screen 1500). Otherwise, the process enters step 2324.

At step 2324, if the access control threshold is not met (e.g., statistical value of 30% access does not meet the threshold 50%), the user may be prevented from accessing the requested media asset without entry of an access code (e.g., display screen 1400).

The above-described embodiments of the present disclosure are presented for purposes of illustration and not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real-time. It should also be noted, the systems and/or methods described above may be applied to, or used in accordance with, other systems and/or methods.

What is claimed is:

1. A method for providing crowd-sourced media access control, the method comprising:
receiving, at a user equipment device, a request from a user to access a media asset;
retrieving a media attribute associated with the media asset;
determining whether access to media assets associated with the media attribute was denied for two or more users of a plurality of users; and
in response to determining that access to the media assets associated with the media attribute was denied for the two or more users of the plurality of users:
retrieving an access control threshold associated with the user, wherein the access control threshold is a percentage of users for which access was denied;
generating a statistical representation of a fraction of the plurality of users for which access to the media assets associated with the media attribute was denied;
comparing the access control threshold to the statistical representation; and
denying access to the media asset for the user when the access control threshold matches the statistical representation.

2. The method of claim 1, further comprising:
retrieving a user attribute associated with the user; and
wherein the plurality of users are associated with the retrieved user attribute.

3. The method of claim 2, wherein the user attribute is an age, age group, gender, profession, citizenship, marital status, security level, or priority level.

4. The method of claim 1, wherein the media attribute is a title, genre, media rating, content keyword, performer, or release date.

5. The method of claim 1, wherein determining whether access to media assets associated with the media attribute was denied comprises:
retrieving, from a database, data associated with the media attribute and the plurality of users; and
comparing the retrieved data with a threshold value to determine if access was denied for the plurality of users.

6. The method of claim 1, further comprising:
determining whether access to the media assets was denied by a ratings-based access control.

7. The method of claim 1, further comprising:
in response to determining that access to the media assets associated with the media attribute was not denied, generating for display the requested media asset.

8. The method of claim 1, wherein denying access to the media asset comprises generating for display a prompt for the user to enter a passcode.

9. A system for providing crowd-sourced media access control, the system comprising:
user input interface circuitry configured to:
receive a request from a user to access a media asset;
storage circuitry configured to:
store a media attribute associated with the media asset; and
processing circuitry configured to:
retrieve the media attribute;
determine whether access to media assets associated with the media attribute was denied for two or more users of a plurality of users; and
in response to determining that access to the media assets associated with the media attribute was denied for the two or more users of the plurality of users;
retrieve an access control threshold associated with the user, wherein the access control threshold is a percentage of users for which access was denied;
generate a statistical representation of a fraction of the plurality of users for which access to the media assets associated with the media attribute was denied;
compare the access control threshold to the statistical representation; and
deny access to the media asset for the user when the access control threshold matches the statistical representation.

10. The system of claim 9, wherein the storage circuitry is further configured to:
store a user attribute associated with the user; and
wherein the plurality of users is associated with the user attribute.

11. The system of claim 10, wherein the user attribute is an age, age group, gender, profession, citizenship, marital status, security level, or priority level.

12. The system of claim 10, wherein the media attribute is a title, genre, media rating, content keyword, performer, or release date.

13. The system of claim 10, wherein the processing circuitry is further configured to:
retrieve, from storage circuitry, data associated with the media attribute and the plurality of users; and
compare the retrieved data with a threshold value to determine if access was denied for the plurality of users.

14. The system of claim 10, wherein the processing circuitry is further configured to:
determine whether access to the media assets was denied by a ratings-based access control.

15. The system of claim 10, wherein the processing circuitry is further configured to:
in response to determining that access to the media assets associated with the media attribute was not denied, generate for display the requested media asset.

16. The system of claim 10, wherein the processing circuitry is further configured to generate for display a prompt for the user to enter a passcode.

* * * * *